United States Patent [19]

Matsko et al.

[11] Patent Number: 4,794,484

[45] Date of Patent: Dec. 27, 1988

[54] CIRCUIT INTERRUPTER APPARATUS WITH A STYLE SAVING OVERRIDE CIRCUIT

[75] Inventors: Joseph J. Matsko, Beaver; William E. Beatty, Jr., New Sewickley Township, Beaver County; Raymond O. D. Whitt, Beaver; Gary F. Saletta, Penn Township, Westmoreland County, all of Pa.

[73] Assignee: Westinghouse Electric Corp., Pittsburgh, Pa.

[21] Appl. No.: 17,306

[22] Filed: Feb. 20, 1987

[51] Int. Cl.⁴ .................................. H02H 3/08
[52] U.S. Cl. ........................... 361/93; 361/96
[58] Field of Search .................... 361/92–98, 361/89, 44; 340/622, 660, 664; 364/481, 483, 492; 302/66

[56] References Cited

U.S. PATENT DOCUMENTS

| | | | |
|---|---|---|---|
| 3,590,326 | 6/1971 | Watson . | |
| 3,818,275 | 6/1974 | Shimp . | |
| 3,944,890 | 3/1976 | Little | 361/96 |
| 4,219,860 | 8/1980 | DePuy | 361/94 |
| 4,331,997 | 5/1982 | Engel et al. | 361/93 |
| 4,331,998 | 5/1982 | Matsko et al. | 361/93 |
| 4,377,836 | 5/1983 | Elms et al. | 361/96 |
| 4,414,601 | 11/1983 | Conroy, Jr. | 361/94 X |
| 4,442,472 | 4/1984 | Pang et al. | 361/96 |
| 4,476,511 | 10/1984 | Saletta et al. | 361/96 |

OTHER PUBLICATIONS

G.E. Product brochure-GET6963, Title: EPIC Microversatrip; Date: Copyright 1986.
Square D Product brochure, Title: Micrologic; Date: Copyright 1985.

Primary Examiner—A. D. Pellinen
Assistant Examiner—Todd E. De Boer
Attorney, Agent, or Firm—G. E. Hawranko

[57] ABSTRACT

A circuit interrupter includes a circuit arrangement for sampling a conditioned current value and determining operating characteristics related to the current flow through an electrical circuit. Also included is a circuit arrangement for comparing the operating characteristics to preselectable tripping parameters and for initiating a trip condition when an operating characteristic exceeds a corresponding tripping parameter. Additionally, a circuit arrangement for initiating a hardware override trip condition using a minimum number of components upon sensing an override signal, is also included; the override signal representing a limit selectable from a range of values.

10 Claims, 27 Drawing Sheets

CIRCUIT INTERRUPTER APPARATUS WITH A STYLE SAVING OVERRIDE CIRCUIT

CROSS-REFERENCE TO RELATED APPLICATIONS

The present invention is related to material disclosed in the following copending U.S. patent applications, all of which are assigned to the same assignee as the present application.

Ser. No. 017,376, "Circuit Interrupter with a Selectable Display Means" filed Feb. 20, 1987, by J. J. Matsko and G. F. Saletta;

Ser. No. 017,300, "Circuit Interrupter with a Style Saving Rating Plug" filed Feb. 20, 1987, by J. J. Matsko and G. F. Saletta;

Ser. No. 017,371, "Circuit Interrupter with a Battery Backup and Reset Circuit" filed Feb. 20, 1987, by J. J. Matsko and G. F. Saletta now U.S. Pat. No. 4,751,606;

Ser. No. 017,296, "Circuit Interrupter with an Integral Trip Curve Display" filed Feb. 20, 1987, by J. J. Matsko and J. A. Wafer now U.S. Pat. No. 4,752,853.

BACKGROUND OF THE INVENTION

1. Field of the Invention

This invention relates generally to solid-state circuit interrupters and more specifically, to such circuit interrupters as are utilized in molded case and metal clad type circuit interrupters and as are capable of acting on a number of complex electrical parameters in order to protect the electrical conducting system and devices connected thereto. This invention further relates to such circuit interrupters that allow for system user interaction so that the number of electrical parameters can be easily and readily understood and responded to.

2. Description of the Prior Art

The solid-state circuit interrupter is being employed today for significantly more complex commercial and industrial applications than was the original circuit interrupter first introduced as a resettable replacement for a common fusing element. Additionally, with the recent explosion in the use and performance attributes of the microprocessor arts along with the coincident increasing cost advantage for such devices, the application of microprocessor teachings to the circuit interrupter field has brought a commensurate demand for more complex analysis, greater performance features, and easier interaction with the solid-state circuit interrupter while at the same time, maintaining or improving the cost factor for such circuit interrupters.

An existing microprocessor based solid-state circuit interrupter is disclosed in U.S. Pat. No. 4,331,997 issued to Engel and assigned to the same assignee as the present application. This device was able to apply microprocessor technology to existing circuit interrupters while maintaining the supervisory control over such factors as instantaneous protection, short delay protection, long delay protection and ground fault protection that were found on existing solid-state circuit interrupters such as those that utilized discrete or other integrated circuit electronic components. As examples of circuit interrupters utilizing discrete components, reference is now made to U.S. Pat. No. 3,590,326 issued to Watson on June 29, 1971 and U.S. Pat. No. 3,818,275 issued to Shimp on June 18, 1974. In addition, the microprocessor based circuit interrupter was able to incorporate display and input monitoring techniques that provided for more accurate and reliable interface and operation of the electrical distribution system on which the circuit interrupter was being utilized.

This processor based circuit interrupter also proved advantageous in energy management systems where it was necessary to configure the electrical distribution system to achieve maximum energy efficiency and a minimum circuit interruption to the system as a whole. It is well known in the field that in configuring an electrical distribution system, a main circuit interrupter which protects a line feeding a number of branch circuits each having a branch circuit interrupter disposed thereon, should have delay times assigned so that in the event of a fault in one of the branch circuits, the associated branch circuit interrupter would trip before the main circuit interrupter. In this manner, the entire electrical distribution system would not be interrupted by a fault condition in a branch circuit and, the device or devices which that branch circuit was feeding, would also be protected in a more timely manner. Still other zone interlocking conditions can be accommodated using similar design criteria as the above example.

The microprocessor based circuit interrupter also proved advantageous over existing circuit interrupters in the method of selecting and adjusting the tripping parameters. The electrical distribution system design was greatly simplified since it was no longer required that a trial-and-error approach to field timing the tripping parameters be performed.

This microprocessor based circuit interrupter though effective and certainly an advance over the then existing circuit interrupters, did have certain limitations that the present application addresses and overcomes. For instance, it would have been a great advantage to have a communication link tied to the microprocessor based circuit interrupter so that in working with an energy management system the circuit interrupter could be instructed from a remote location to perform various supervisory tasks such as, for example, a load shedding operation.

Another example of such a limitation can be found in the use of what is commonly referred to as an override circuit. The override circuit establishes the maximum withstand rating of the particular circuit interrupter; the withstand rating being the current limit which, if exceeded, would result in damage to the tripping mechanism such as welding of the contacts. Since the withstand rating can vary according to the tripping mechanism with which the circuit interrupter is being used, it can be appreciated that a number of different override protection circuits can be provided for any particular circuit interrupter. Recognizing also that there is a number of rating plug factors which can be selected for the particular circuit interrupter, it becomes evident that a significantly large number of possible combinations of override values and plug rating factors can be achieved. The consequence of providing for all combinations of override settings together with all possible plug rating factors is the requirement that a large inventory of different combination circuit interrupters be maintained.

If an attempt were made to incorporate the element which establishes the override setting into the plug rating element, there would still be a need to maintain a large inventory of rating plugs that would accomodate all the possible combinations of override settings and plug rating factors. Additionally, a cumbersome interlocking arrangement would be needed between the elements that establish the two variables to provide for multiple plug styles for each rating plug factor and for each override level.

SUMMARY OF THE INVENTION

It is therefore an object of the invention to provide a solid state circuit interrupter that provides for a variety of possible override circuit settings and a variety of plug rating factors using a minimum number of components positionable in a particular manner so as to require only a minimal effort to modify the combination of attainable factors.

In accordance with the principles of the present invention, there is provided a solid state circuit interrupter that includes a means for interrupting current in a normally conducting electrical circuit upon sensing a trip command, a means for conditioning a current value proportionate to the flow of current through the electrical conducting circuit, a means for sampling the conditioned current value to determine operating characteristics therefrom which are compared to tripping parameters as represented in a conventional trip curve, and a means for developing an override signal which is effective for controlling operation of a switching element so that the interrupting means can be directly and instantly actuated thereby. This circuit interrupter apparatus also includes a means for determining a highest override signal from among a number of override signals and presenting the highest override signal to an override limit determining element which can be varied to achive different override limits and which, when the override limit is met, breaks down to thereby control the switching element.

DESCRIPTION AND OPERATION

I. GENERAL BACKGROUND INFORMATION

A. Description and Application of a Prior Art Circuit Interrupter

Figure 1:
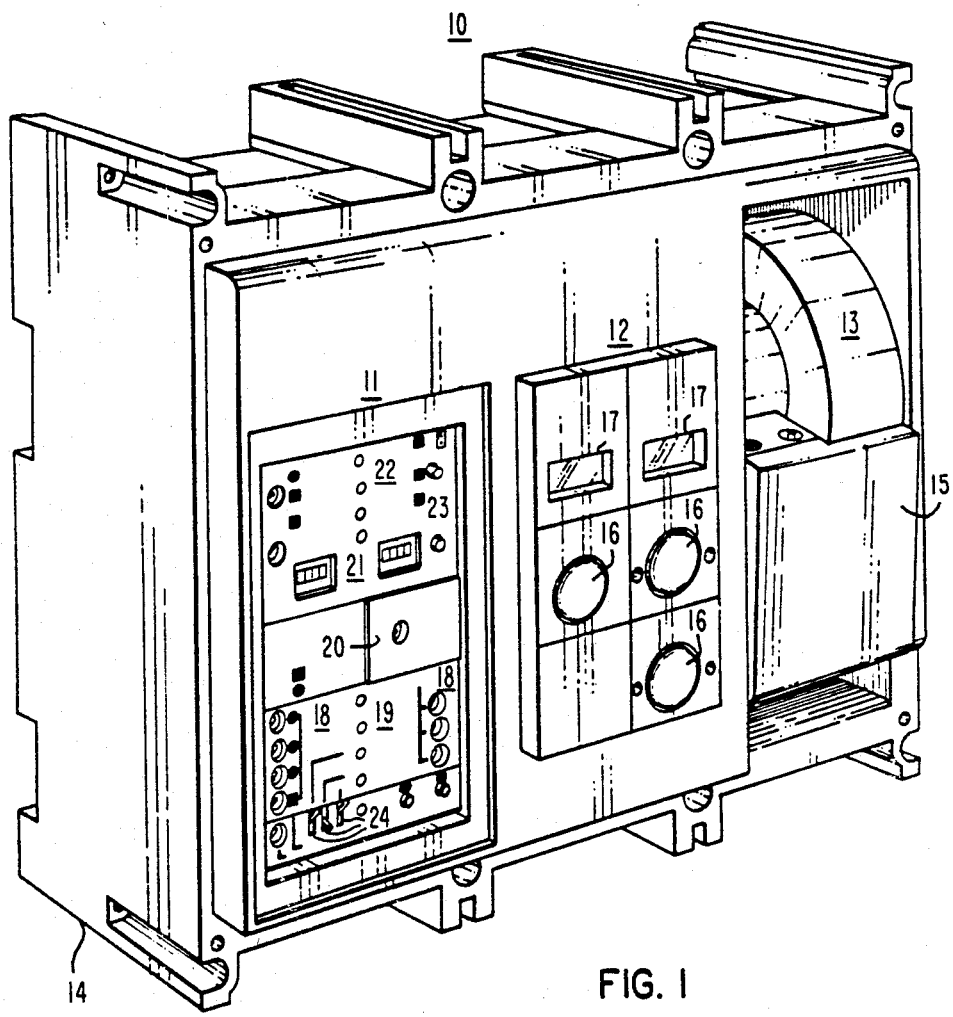
FIG. 1 is a perspective view of a circuit interrupter constructed in accordance with the prior art.

Before discussing the description and operation of the present invention, a brief description of the prior art circuit interrupter will first be presented followed by a discussion of an application of circuit interrupter devices to a typical electrical distribution system. As seen in FIG. 1, the prior art microprocessor based circuit interrupter 10 includes three main segments, a trip unit segment 11, a manual control segment 12, and a charging segment 13, all disposed in a molded case housing 14. The charging segment 13 includes a spring (not shown) which can be used to operate the contacts (not shown) associated with the trip coil (not shown) and a handle 15 which can manually charge the spring or an electric motor (not shown) which can also charge the spring. The manual control segment 12 includes a plurality of pushbuttons 16 which control the action of the spring in relation to the contacts and windows 17 through which the status of the spring and contacts can be viewed.

The trip unit 12 includes an array of potentiometers 18 which are used for selectively adjusting the tripping parameters under which the circuit interrupter is intended to operate, a group of fault indicating LED's 19 which light to indicate a cause of trip, a plug rating element 20 which establishes the maximum continuous current allowed through the circuit interrupter 10, and the numeric display elements 21 with the associated indicating LED's 22. Also included on the trip unit 12 are certain control pushbuttons 23 which may include a reset pushbutton, ground-and-phase test pushbuttons and a peak energy reset pushbutton, in addition to control switches 24 for selecting the characteristic shapes of portions of the trip curve and for selecting test characteristics.

Figure 4:
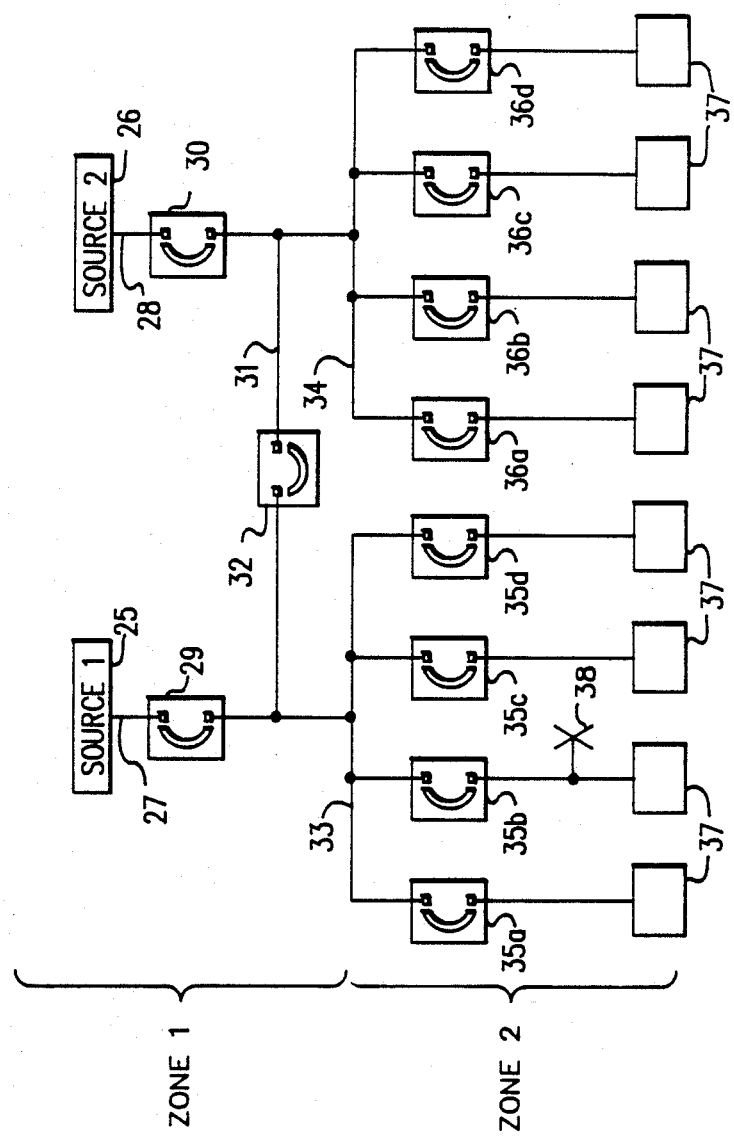
FIG. 4 is a block diagram of a typical electrical distribution system utilizing circuit interrupters of the type shown in FIG. 2.

In applying a circuit interrupter to an electrical distribution system, whether of the existing known type or of the presently disclosed type circuit interrupter, certain system design criteria must be followed as will now be described with reference to FIG. 4. A typical electrical distribution system will include at least one energy source shown in FIG. 4 in block form as a first and a second source 25 and 26 which feed respective first and second main distribution lines 27 and 28. Disposed on the first and second main distribution lines 27 and 28 are respective first and second main circuit interrupters 29 and 30. Also shown in FIG. 4 is a tie distribution line having disposed thereon a tie circuit interrupter 32 which can be effective in the event that one of the first and second main circuit interrupters has gone to a trip condition, for connecting the other of the first and second energy sources 25, 26 thereover. Branching off from each of the first and second main distribution lines 27 and 28 are respective pluralities of branch circuit lines 33a through 33d and 34a through 34d. Disposed on each of the plurality of branch distribution lines 33a through 33d and 34a through 34d are individual branch circuit interrupters 35a through 35d and 36a through 36d which are effective for controlling the flow of current through the plurality of branch distribution lines 33a through 33d and 34a through 34d to a plurality of load elements 37.

As an example of the operation of these circuit interrupters disposed on this entire electrical distribution system, it will be assumed that a fault condition has occurred in one of the first plurality of branch distribution lines referenced as 33b, such fault condition being designated as reference 38.

The fault condition 38 which may be an overcurrent condition caused by a short circuit, must be interrpted in as short a time as possible, preferably on the order of 50 milliseconds or less so that damage to the distribution system can be prevented. Additionally, it is necessary that the branch circuit interrupter 35b initiate a trip condition in this short time so that the first and second main circuit interrupters 29 and 30 and the tie circuit interrupter 32 do not trip which would cut off energy to the remaining plurality of branch distribution lines. This method of timing the tripping sequence of a series of circuit interrupters requires that a delay time be introduced whereby the first and second main circuit interrupters 29 and 30 are configured to wait for a preselected period of time before initiating a trip condition in order to allow the affected branch circuit interrupter 33b the opportunity to initiate the trip condition. As seen in FIG. 4, the first and second pluralities of branch circuit interrupters 33a through 33d and 34a through 34d are separated from the first and second main circuit interrupters 29 and 30 according to a zone format with the first and second main circuit interrupters being located in a first zone, designated zone 1 and the first and second pluralities of branch circuit interrupters 33a through 33d and 34a through 34d being located in a second zone, designated zone 2. It can be appreciated that additional zone levels can be added by following the same time delay principles being employed throughout the successive zone layers.

As discussed, the first and second main circuit interrupters wait a predetermined period of time following sensing of the fault conditon 38 in another zone; however, in the event that the fault condition 38 persists, the first main circuit interrupter 27 would proceed to a trip condition following expiration of the preselected period of time. The sensing of the fault condition 38 occurring in the other zone, zone 2, is accomplished by use of zone interlocking signals which will be described hereinafter in further detail but which can now be described here in short as a signal transferred from the affected branch circuit interrupter 33b to the first main circuit interrupter 29 indicating that either a short delay pickup current or a ground fault pickup current has been exceeded. Each circuit interrupter is capable of receiving and transmitting a ground fault zone interlocking signal and a short delay zone interlocking signal.

B. Characteristics of a Time-Trip Curve

Figure 5:
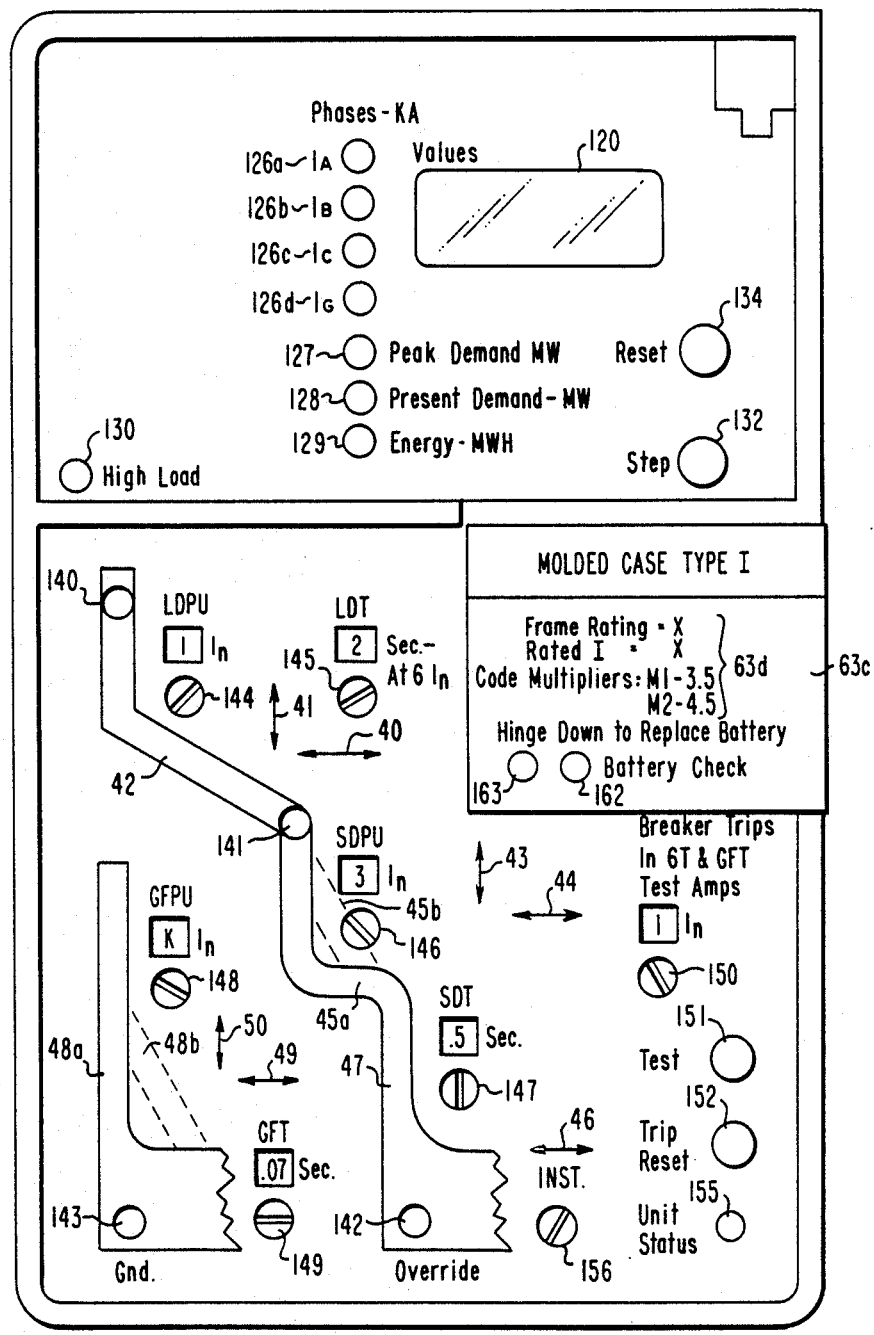
FIG. 5 is a detailed view of the front panel of the circuit interrupter shown in FIG. 2.

In coordinating the delay times and performance characteristics of the circuit interrupters associated with the electrical distribution system, reference must be made to the characteristics of a time-trip curve as can be represented by the trip curve segments shown in FIG. 5. The time-trip curve can be generally described as a graphical representation, using a log-log scale, of the desired current response characteristics of the circuit interrupter over a time period wherein the current factor is shown in the horizontal axis and the time factor is shown on the vertical axis as depicted in FIG. 5.

Starting at the top and leftmost portion of the larger, main trip curve segment, specific factors relating to a long delay protection feature are plotted and follow generally the sloped portion of the curve. The long delay protection feature sometimes referred to as a thermal trip feature since it most closely resembles a thermal-type tripping operation typically offered by predecessor non-electronic circuit interrupters, consists of both a selectable current factor as shown by a first current selecting arrow 40 which corresponds to a long delay pickup factor hereinafter referred to as the LPDU factor and a long delay time factor hereinafter referred to as a LDT factor and which is represented by the first time selecting arrow 41. In selecting the parameters under which the long delay protection feature will be provided, the first current selecting arrow 40 indicates that the LDPU factor or parameter selectively adjusts the trip curve along the horizontal axis. Additionally, the LDT factor or parameter selectively adjusts the trip curve along the vertical axis as illustrateed by the first time selecting arrow 41. Accordingly, the limits of the long delay protection feature are adjustable in both the X and Y axis and provide for a long delay protection feature which follows the slope of the first trip-curve portion 42.

In practice, the long delay protection feature provides an $I^2T$ trip characteristic for currents exceeding the LDPU level. It should be understood that, at higher levels of current in excess of the LDPU level, a shorter LDT will result.

At higher levels of current flow through the electrical conducting circuit, it is necessary that the solid-state circuit interrupter provide a more rapid response than that provided by the long delay protection feature. This more rapid response is commonly referred to as a short delay protection feature and is characterized by the portion of the main trip-curve segment designated as the short delay trip-curve portion 45 shown in FIG. 5. The short delay protection feature can be selectively configured in one of two manners, illustrated in FIG. 5 as a solid horizontal line 45a indicating a fixed time response, and a dashed, slope line 45b indicating an $I^2T$ response.

A second current selecting arrow 43 shown adjacent to the short delay trip-curve portion 45 illustrates that the current level at which a short delay trip condition will be initiated can be adjusted, this current level commonly being referred to as a short delay pickup factor hereinafter referred to as a SDPU factor. Under certain conditions, as will be described hereinafter in further detail, it is necessary that the short delay trip condition be initiated immediately upon sensing a current value in excess of the SDPU factor. Other conditions utilize the fixed time short delay trip-curve portion 45a. Still other conditions arise where it is necessary to impose an $I^2T$ trip characteristic corresponding to trip curve portion 45b. In support of this condition, a second time selecting arrow 44 is shown adjacent to the short delay trip-curve portion 45b.

The next level of protection offered by the solid-state circuit interrupter is illustrated in the bottom rightmost portion of the man trip-curve segment and is referred to as the instantaneous trip-curve portion 47 which corresponds to an instantaneous protection feature. At very high levels of overcurrent through the electrical conducting circuit, it is necessary that the circuit interrupter initiate a trip condition as rapidly as possible, for instance within 50 milliseconds or less of sensing the overcurrent condition. This overcurrent level is selectively adjustable as illustrated by the third current selecting arrow 46 shown adjacent to the instantaneous trip-curve portion 47.

As illustrated in the smaller trip-curve segment shown in FIG. 5, a ground fault protection feature provides the same types of protection as does the short delay protection feature; that is, a fixed time ground fault protection is shown as the solid vertical line 48a or and $I^2T$ ground fault protection is shown as a dashed, sloped line 48b. The ground fault protection feature provides that, should a certain level of current be flowing through a ground path associated with the electrical conducting circuit in excess of a ground fault pickup factor hereinafter referred to as a GFPU factor, a ground fault trip condition will be initiated. The GFPU factor or parameter is selectively adjustable as illustrated by the fourth current selecting arrow 49 shown adjacent to the ground fault trip-curve portion 48a.

Under certain conditions, to be discussed hereinafter in further detail, it is necessary to wait a period of time, designated a ground fault time factor, hereinafter referred to as a GFT factor or parameter, before initiating a ground fault trip condition. This GFT factor is also selectively adjustable as illustrated by the third time selecting arrow 50.

II. SPECIFIC PHYSICAL DESCRIPTION

A. Circuit Interrupter

In describing the physical and operational characteristics of the microprocessor based solid-state circuit interrupter of the present application, reference will first be made to FIG. 2 where the solid-state circuit interrupter 60 is shown as having three main modular segments, an auxiliary trip segment 61, an input segment 62, and the trip unit segment 63 which are shown mounted in a molded insulated case housing 64. The auxiliary trip segment 61 contains such circuitry as an auxiliary power supply for use by the trip unit segment 63 following interruption of the line current, and alarm output circuitry used with external indicators. The auxiliary trip segment circuits which provide additional, optical features to the basid solid-state circuit interrupter 60 can be easily and readily added or removed, will be described hereinafter in further detail with reference to FIG. 14. The input segment 62 includes a terminal board 65 through which various input and output signals and conditions can be connected with the trip unit segment 63.

Figure 2:
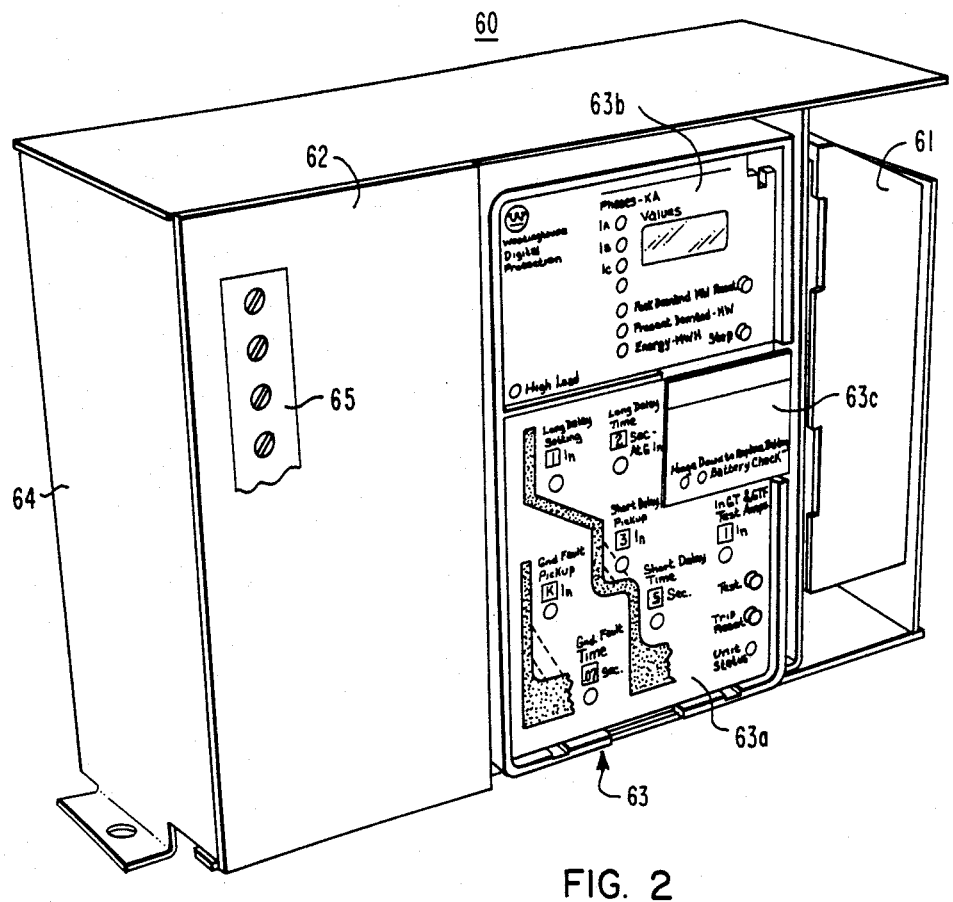
FIG. 2 is a perspective view of a circuit interrupter constructed in accordance with the present invention.

The trip unit segment 63 shown in FIG. 2 consists essentially of three main portions which are as follows: the basic fault indicating and selecting portion 63a which occupies the lower portion as shown in FIG. 2; the display board portion 63b which occupies the upper portion as shown in FIG. 2; and a rating plug portion 63 which occupies approximately the middle right-hand portion of the trip-unit segment 63.

Included in the basic fault indicating and selecting portion 63a are the trip-curve segments and a series of indicating elements, rotary switches, and pushbuttons which will be described in greater detail with reference to FIG. 5. The display board portion 63b includes display elements and pushbuttons which are used by the system operator to better understand and react to the operating conditions of the solid-state circuit interrupter 60. The display elements and pushbuttons will also be described in greater detail with reference to FIG. 5.

In configuring an electrical distribution system utilizing a number of solid-state circuit interrupters of the type shown in FIG. 2, the requirements as to the number of options for each solid state circuit interrupter which would provide the greatest economical advantage for that particular configuration, can vary significantly with the requirements of another electrical distribution system. To that end, it is desirable to provide the greatest number of features to the solid-state circuit interrupter 60 that are on an optional, as needed basis so that such features can be added or removed as deemed economically advantageous. Accordingly, in addition to the auxiliary trip segment 61, the display board portion 63b of the tip-unit segment 63 can also be added or removed as necessary.

In addition to the basic fault indicating and selecting portion 63a of the trip-unit segment 63 being essential, it is also necessary to equip the basic solid-state circuit interrupter 60 with a plug rating portion 63c. The plug rating portion 63c establishes the maximum continuous current allowed through the solid-state circuit interrupter 60 and is described hereinafter in greater detail with reference to FIG. 9.

B. Description of the Block Diagram of FIG. 3

The application of the present microprocessor based solid-state circuit interrupter 60 to a particular electrical conducting circuit as for instance one of the plurality of branch distribution lines 33a through 33d, can best be described with reference to the block diagram shown in FIG. 3 where the electrical conducting circuit is a 3-phase electrical circuit connected to line terminals 70 which are associated with the terminal board 65 and lead to corresponding three internal lines 71. Though shown as applying to a 3-phase circuit, it is understood that the solid-state circuit interrupter 60 can be utilized with other single-phase or multi-phase configurations.

Associated with the three conducting lines 71 are respective line current transformers 72 and a ground current transformer 73 which are effective for developing thereover, current values proportionate to the current flowing in the phase circuits and ground path circuit of the electrical conducting circuit.

The ground current value developed by the ground current transformer 73 is coupled to a ground current rectifier circuit 75 for full wave rectification of the incoming AC ground current value. Similarly, the line phase current values are coupled to a phase current rectifier circuit 74 which full wave rectifies the incoming AC phase current values. Both the rectified ground and phase currents are coupled to a summing circuit 76 to charge a capacitor whose DC voltage is developed and thereafter supplied to a power supply circuit 77. The power supply circuit 77 regulates and converts this specific DC voltage output to regulated DC voltage levels usable by the remaining circuitry of the solid-state circuit interrupter 60; such regulated DC voltage levels including but not limited to 5 volts, 16 volts and 30 volts DC.

The power supply circuit 77 can also obtain the specific DC voltage needed to generate these regulated DC voltage levels from the auxiliary power circuit 61 or from an external DC source.

The summing circuit 76 is shunt regulated by a shunt regulating FET element 78 so that under certain conditions, the output of the summing circuit 76 will be shunted to ground instead of being coupled to the power supply circuit 77.

The shunt regulating FET element 78 is controlled at its gate terminal by a signal generated in a shunt and chopper control portion 79b associated with a multi-purpose custom integrated circuit 79. Regarding the shunt and chopper control portion 79b of the multi-purpose custom IC 79, the shunting signal is generated thus turning on the shunt regulating FET 78 only upon sensing that the DC voltage output of the summing circuit 76 has reached the desired specific value thereby preventing overcharging of the charging capacitor associated with the summing circuit 76.

Also contained in the multi-purpose custom IC 79 is a 5-volt power supply chopper control portion 79b. The chopper portion 79b also insures that the 5-volt system supply portion of the power supply 77 is inhibited when the output of the summing circuit 76 is below the specific DC voltage. In this manner, it is understood that any circuitry of the solid-state circuit interrupter 60 reliant upon a 5-volt supply is inhibited in the event that the output of the summing circuit 76 is insufficient, such as would occur upon interruption of the phase currents through the electrical conducting circuit.

The multi-purpose custom IC 79 also includes a current multiplexing portion 79a. The rectified currents are conditioned for input to the current multiplexing portion 79a of the multi-purpose custom IC 79 through a conditioning circuit 80. The current multiplexing portion 79a is controlled by signals from the microprocessor 100 so that a particular current signal may be selected and output from the multi-purpose custom IC 79 upon command of the microprocessor 100.

The selected current signal representative of the sample value of the phase and ground current values is coupled to a current calibration circuit 81 which allows for an adjustment of the calibration level for current signals. The output of the current calibration circuit 81 is designated channel 1 and is input to an Analog-to-Digital converter 82 which can be of a commercially available type such as for example an ADC0844 manufactured by National Semiconductor Corp.

Similar to the current calibration circuit 81, a voltage multiplexing, conditioning, and calibration circuit 83 is receptive of the line-to-neutral voltages of each of the phases of the electrical conducting circuit and is effective for calibrating voltage output signals which are designated channel 2 and is also coupled to the A/D converter 82.

A frame and plug rating circuit 84 associated with the plug rating segment 63c of the trip unit generates a plug rating signal and a frame rating signal which are designated channels 3 and 4, respectively, and are also coupled to the A/D converter 82.

The microprocessor 100 which controls the flow of data through the solid-state circuit interrupter 60 is an 8-bit CMOS microprocessor which is commercially designated aN 80C51 microprocessor. The 80C51 includes a CPU and associated ROM and RAM memories, a serial I/O port, four parallel I/O ports and an on-chip oscillator and control circuit and is readily available in commercial quantities from the Intel Corporation.

Figure 3:
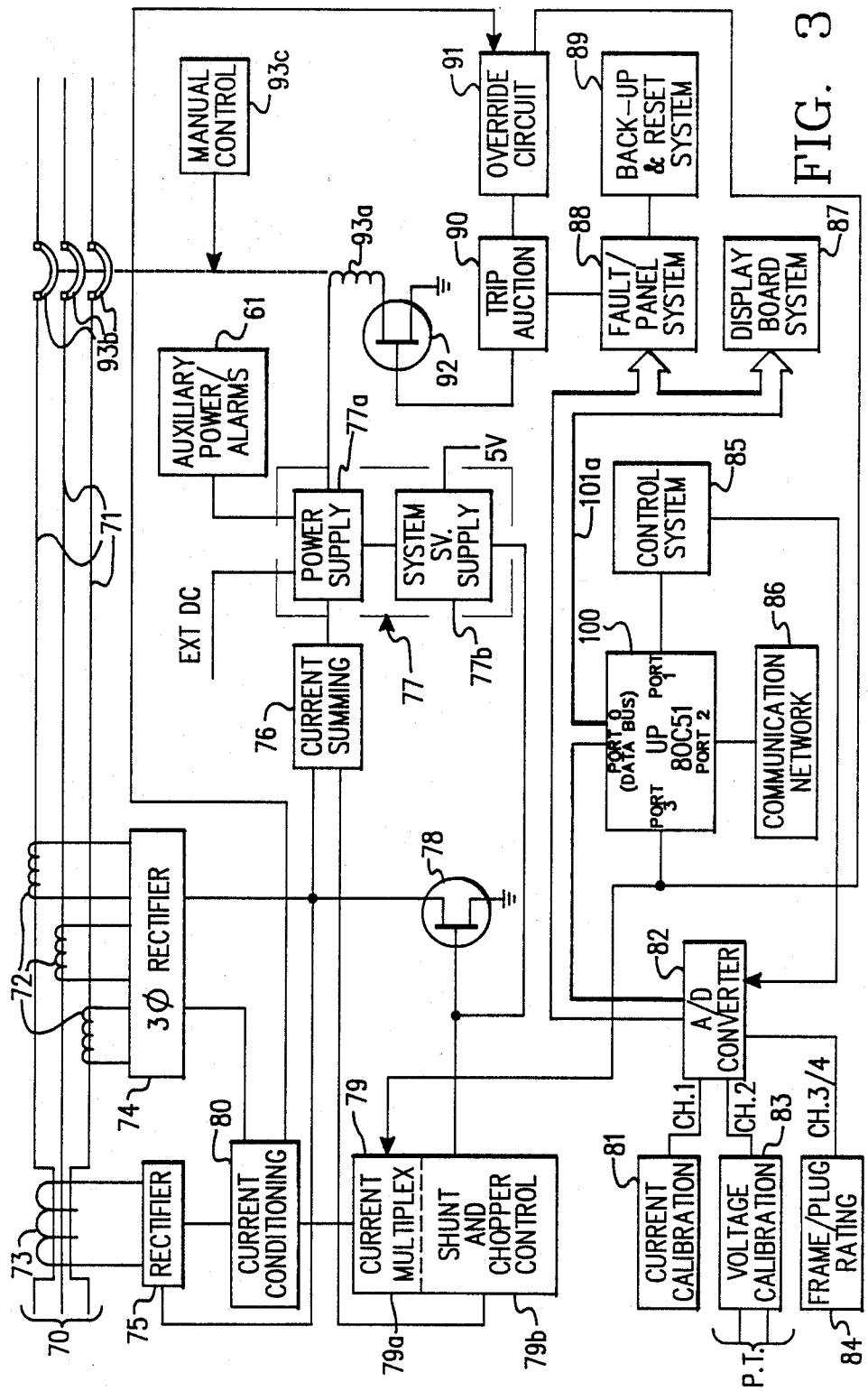
FIG. 3 is a functional block diagram of the circuit interrupter shown in FIG. 2.

As shown in FIG. 3, the microprocessor 100 has associated therewith four parallel I/O ports each of which is specifically designated 0, 1, 2, and 3 and which each serve a specific purpose or function. For instance, the port 0 is designated as the data bus 101 over which data is transferred. As an example of the data received over the data bus 101a, the output of the A/D converter 82 is communicated thereover upon reception of a command from the microprocessor 100. This command is communicated to the A/D converter 82 from port 1, 101b of the microprocessor 100 by way of a control circuit 85.

Port 2, reference 101c, of the microprocessor 100 is configured so as to receive and transmit information relating primarily to a communications network 86 which is effective for linking this particular solid-state circuit interrupter 60 to a central network (not shown) which can coordinate the operation of a number of circuit interrupters.

Port 3, 101d, of the microprocessor 100 is configured so as to provide I/O capabilities for general control signals such as address control of the current multiplexing portion 79a of the multi-purpose custom IC 79, receipt of an override sensed signal, and control of an external relay.

Coupled to the microprocessor 100 over the data bus 101a is the display board system 87 which includes not only the display board portion 63b of the trip-unit segment 63, but also the necessary circuitry to affect operation of the display board portion 63b.

A fault and panel system 88 which includes the fault indicating and parameter selection portion 63a of the trip-unit segment 63 and the related circuitry to affect the operation thereof, is also connected to the microprocessor 100 by way of the data bus 101a.

Associated with the fault and panel system 88 is a backup and reset system 89 which provides that, in the event of a circuit interruption and consequent interruption of the 5-volt supply, a source of energy is available to maintain operation of a cause of fault indication and further provides that, when the system is stopped or restarted, the operation of the microprocessor 100 is not adversely affected.

A trip signal, which is initiated by the microprocessor 100 when some type of overcurrent condition has been sensed, is also communicated through the fault and panel system 89 to a trip auctioneering circuit 90. The trip auctioneering circuit 90 may also receive a second trip signal which is generated from a hardware override circuit 91. The override circuit 91 monitors the output of the current conditioning circuit 80 and generates the second trip signal immediately upon sensing an overcurrent condition greater than a withstand rating of the circuit interrupter. The trip auctioneering circuit 90 is effective for gating on a trip FET 92 when either one of the trip signals is present.

A trip coil 93a associated with the trip mechanism 93 is energized when the trip FET 92 is gated ON by the trip auctioneering circuit 90.

Also associated with the trip mechanism 93 are the trip contacts 93b which are disposed on the electrical conducting lines 71 and open upon energization of the trip coil 93, and a manual control mechanism 93C which provides for a manual operation of the tripping mechanism.

C. Description of the Microprocessor Block Diagram of FIG. 15

Figure 15:
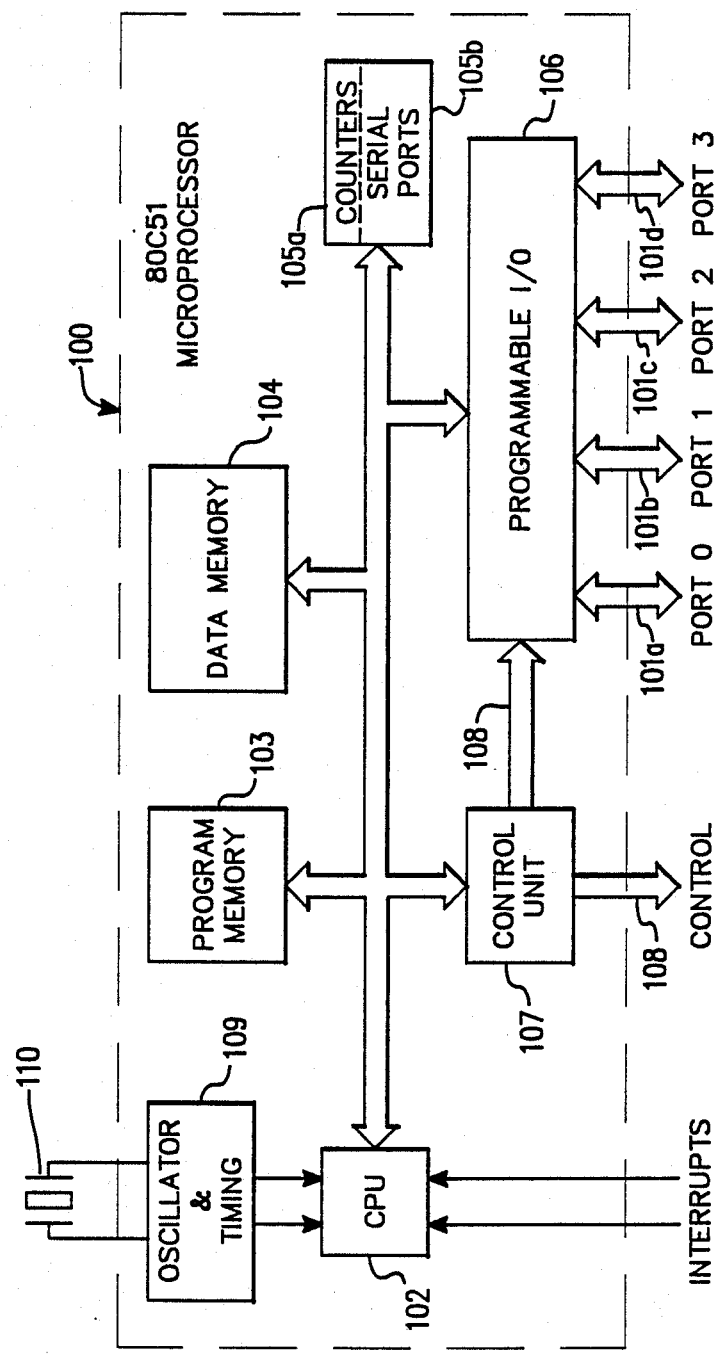
FIG. 15 is a functional block diagram of the 80C51 microcomputer shown in FIG. 3.

As seen in FIG. 15, the microprocessor 100 is an Intel 80C51 microprocessor having an 8-bit format and which contains a CPU segment 102 effective for manipulating the operating instructions and data within the various memory spaces according to a program sequence established by a main instruction loop to be discussed hereinafter in further detail with reference to FIG. 16. The main instruction loop resides in the program memory 103 which in this instance is a non-volatile read only memory (ROM). Data to be operated on by the main instruction loop is moved into and out of data memory 104.

The timing of the microprocessor 100 is governed by the use of an external timing device 109 which in this instance is shown as a crystal but which can be accomplished by various other timing methods that are within the scope of the present application. The timing device 109 is connected to the CPU 102 via an oscillator and timing control segment 110.

III. ELECTRICAL DESCRIPTION

A. Display Board System of FIG. 6

Figure 6:
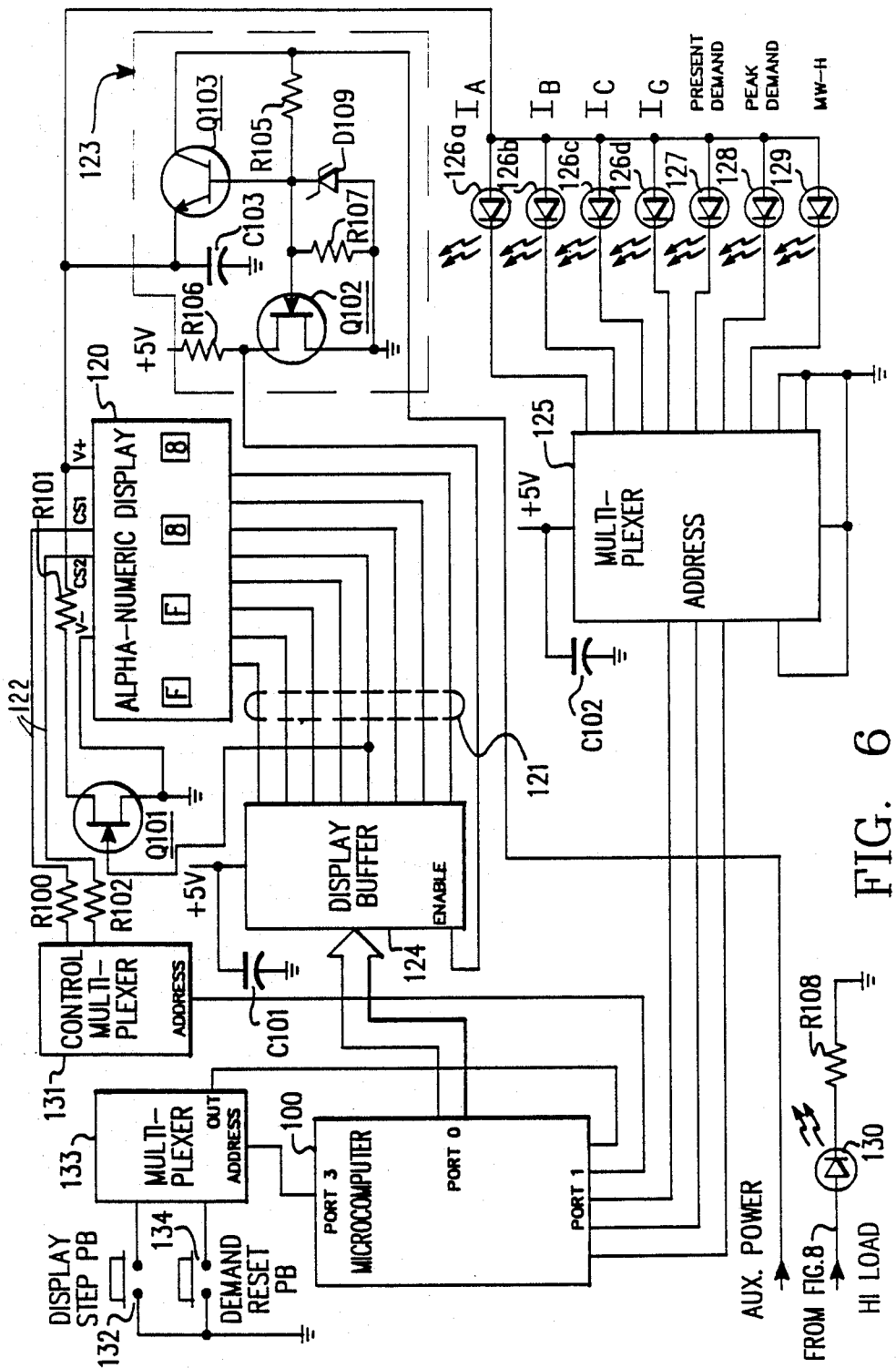
FIG. 6 is a detailed schematic diagram of the display board system shown in FIG. 3.

The display board system shown in FIG. 6 provides the electrical and electronic circuitry which corresponds to and, in fact, operates the display board portion 63b of the trip unit segment 63 shown in FIG. 2. In relation to the solid-state circuit interrupter 60 as a whole, the display board system including the display board portion 63b and associated circuitry is an optional feature and is not essential to the provision of the basic protection and monitoring features of the solid-state circuit interrupter 60.

When selected as an option though, the display board system shown in FIG. 6 provides the system operator with a means of manipulating the information stored in the microprocessor 100 to display phase current magnitudes, ground current magnitude, present and peak demand values, energy usage, a historical record of fault-causing conditions. Identifying LEDs, disposed approximately adjacent to the display element provide an indication of the parameter being displayed.

At the center of the display board system is a four-character alpha numeric intelligent display 120 which is readily available in commercial quantities from manufacturers such as Siemens and National Semiconductor. The alpha numeric display 120 receives data inputs over a plurality of input lines 121, shown in FIG. 6 to be a quantity of eight. Two control lines 122 serve to couple signals CS1 and CS2 to the alpha numeric display 120. The control signals CS1 and CS2 are generated in the microprocessor 100 and control the data flow to the alpha numeric display 120.

The alpha numeric display 120 operates on a 5-volt supply and draws approximately 100 milliamps of current. An independent source of 5-volt power is provided as an integral component of the display board system. This supply is isolated from the system 5-volt supply 77b to insure that the display system does not place an excessive drain on the system 5-volt power supply.

The independent 5-volt supply for the alpha numeric display 120 is derived from a regulator circuit shown generally as reference 123. The regulator circuit 123 derives its source of power from an auxiliary power source which can be, for example, the auxiliary power and alarm circuit 61 shown in FIG. 3. The regulator circuit 123 includes a transistor Q102 and associated components R106 and R107 which are configured so as to recognize the presence of the auxiliary power and generate a display enabling signal consequent thereto.

Also included in the regulator circuit 123 are the components which actually regulate the auxiliary power to derive the 5-volt power, these components including transistor Q103, capacitor C103, resistor R105 and Zener diode D109.

A display buffer element 124 is utilized in the display board system as a means of isolating the microprocessor 100 from the alpha numeric display 120. The display buffer 124 is a tri-statable type buffer; that is, the output can be one of three states, a positive state, a negative state, and a high impedance state. The display buffer 124 makes available at its output, for communication over the plurality of input lines 121, the display data bits which originate at the microprocessor.

The display buffer 124, however, only makes these display bits available when the display enabling signal is received from the regulator circuit 123. The display buffer 124 receives the data bits that it transfers to the alpha numeric display 120 over port O of the microprocessor, the data bus 101a.

Port 1, 101b of the microprocessor 100, simultaneous to the transmission of the data bits to the display buffer 124, outputs a specific code to a multiplexer element 125 which serves to activate a specific identifying LED indicative of the parameter being displayed. This labelling multiplexer 125 acts as a 3-bit to 8-bit decoder; that is, the labelling multiplexer 125 receives three bits of information over port 1, 101b, of the microprocessor 100 and decodes this information to light an appropriate one of a possible eight LED's. As seen in FIG. 6, the solid-state circuit interrupter 60 only utilizes seven of the possible eight outputs of the labelling multiplexer 125 to activate the one of seven identifying LED's which are shown on the display board portion 63b of the trip unit segment 63 and labelled as phase current LED's IA, IB and IC 126a through 126c, a ground current LED 126d, a present demand LED 127, a peak demand LED 128, and an energy usage LED designated as an MWH LED 129.

An eighth LED 130 which indicates a high load condition for the solid-state circuit interrupter 60 is also disposed on the display board portion 63b but is activated by a separate high load signal. The high load LED 130 when lit, signifies that the solid-state circuit interrupter 60 is monitoring a current value in the electrical conducting circuit in excess of 85% of the full load rating.

Also output from port 1, 101b of the microprocessor 100 is information to a control multiplexer 131 which outputs the first and second control signals CS1 and CS2. Resistors R102 and R103 are disposed in the two control lines 122 to function as a means of further isolating the alpha numeric display 120 from the microprocessor 100.

A display shunting FET Q101 and an associated biasing resistor R101 are connected across the voltage supply terminals V+, V− of the alpha numeric display 120 in a manner such that the supply of the voltage to the alpha numeric display 120 is controlled as a function of an output of the display buffer 124.

As previously discussed, the display board system offers a user interactive feature which allows the system operator to selectively manipulate the display feature to thereby obtain the desired information at a controlled, comfortable pace.

To accomplish this function, a display step pushbutton 132 is disposed on the display board portion 63b of the trip-unit segment 63 at a position adjacent to the identifying LED's 126a through 126d and 127 through 129 and the alpha numeric display 120.

As seen in FIG. 6, the display step pushbutton 132 when depressed, couples a low input signal to a pushbutton multiplexer 133 which, when addressed by a signal from port 3, 101d of the microprocessor 100, outputs the condition of the display step pushbutton 132 to an input on port 1, 101b of the microprocessor 100. Recognition of this display step pushbutton 132 condition effects an operation within the main instruction loop that selects a next parameter to be displayed on the alpha numeric display 120 and to be indicated on the identifying LED's.

A second pushbutton, a demand reset pushbutton 134, is also disposed on the display board portion 63b of the trip unit segment 63 adjacent to the display step pushbutton 132 and further, also couples a low signal to the pushbutton multiplexer 133 when depressed. The status of this demand reset pushbutton 134 is also communicated over port 1, 101b of the microprocessor 100 upon a command received over port 3, 101d of the microprocessor 100.

The demand reset pushbutton 134 serves to reset the value stored in memory for the peak demand figure, such peak demand figure representing the highest power demanded over the electrical conducting circuit since the occurrence of the last demand reset pushbutton actuation or since the start-up of the solid-state circuit interrupter 60.

As previously discussed, the display board system is an optional one and therefore in order to provide a more cost effective, yet functionally effective solid-state circuit interrupter, this option can be omitted. In so providing this as an optional feature, the architecture of the circuitry is configured so that essential components such as the microprocessor 100 and the pushbutton multiplexer 133 are not disposed on the same circuit board as the optional display board components.

In this manner, the basic solid-state circuit interrupter 60 can be configured without the display board portion 63b and the system circuit board (not shown) on which the display board components are mounted but instead, having a blank panel (not shown) in place therefor.

B. Fault and Input Panel System of FIG. 7

Similar to the discussion for the display board system shown in FIG. 6, the discussion of the fault and panel input system of FIG. 7 will be made with reference to the trip-unit segment 63 and specifically with reference to the fault indicating and selecting portion 63a. The trip-unit segment 63 shown in greater detail in FIG. 5, will be referenced here in conjunction with the circuit components associated with the fault panel input system shown in FIG. 7. As the fault and panel input system is an essential system, certain essential components previously discussed are illustrated here as well and consequently will utilize the same reference numbers as previously assigned.

One of the primary criteria that the fault and input system must meet is the facility with which this interfacing arrangement can be used and understood by system operators who can typically exhibit capabilities and skills over a wide range. This fault and panel system should provide any system operator, regardless of his level of experience or of the language that he speaks, with the ability to operate and understand the solid-state circuit interrupter in the context of an overall electrical distribution system.

To this end, as seen in FIG. 5, the conventional time-trip curve having the two trip curve segments is shown having disposed on the actual curve sections, the fault indicating LED's which correspond to the types of protections previously discussed. For instance, a long delay trip LED 140 is disposed on the long delay trip portion 42 of the main trip-curve segment, a short delay trip LED 141 is disposed on the short delay trip portion 45, an instantaneous trip LED 142 is disposed on the instantaneous trip-curve portion 47 and a ground fault trip LED 143 is disposed on the ground fault trip-curve portion 48 of the second trip-curve segment.

Also shown on the fault indicating and selecting portion 63a of the trip-unit segment 63 is a plurality of rotary switches which are disposed proximately adjacent to the portions of the main and second trip-curve segments that they affect.

The first rotary switch 144 is effective for selecting a value for the LDPU factor, such value being selectable from a range of current settings indicated by the first current selecting arrow 40. A second rotary switch 145 selects a value for the LDT factor according to the range of the first time selecting arrow 41. A third rotary switch 146 selects the value for the SDPU factor according to the range of the second current selecting arrow 43. A fourth rotary switch 147 selects the value for the SDT factor according to the range of the second time selecting arrow 44. A fifth rotary switch 156 selects the value for the INSTPU factor according to the range of the third current selecting arrow 46. A sixth rotary switch 148 selects the value for the GFPU factor according to the range of the fourth current selecting arrow 49. A seventh rotary switch selects the value for the GFT factor according to the range of the third time selecting arrow 50. An eighth rotary switch 150 is effective for selecting test values of both phase current and the ground current. These test values are utilized to simulate actual current values. The test values are acted upon by the main instruction loop only in conjunction with the operation of a test pushbutton 151 and only under certain actual current conditions as will be described hereinafter in further detail. Testing can be conducted in either a trip or a no-trip mode; that is, when the test current reaches the selected test current value, the main instruction loop will either initiate a trip signal or prevent initiation of the trip signal.

Disposed on the fault selecting and indicating panel 63a adjacent to the test pushbutton 151 is a trip reset pushbutton 152 which allows the system operator to reset the trip condition if operating conditions so permit.

Because of the above-discussed disposition of the fault indicating LED's 140 through 143, on the trip-curve segments and the factor selecting rotary switches 144 through 150 and 156 adjacent to the trip-curve segments, it can be appreciated that any system operator with an understanding of the characteristics of the conventional time-trip curve can operate and understand the solid-state circuit interrupter 60.

Figure 7:
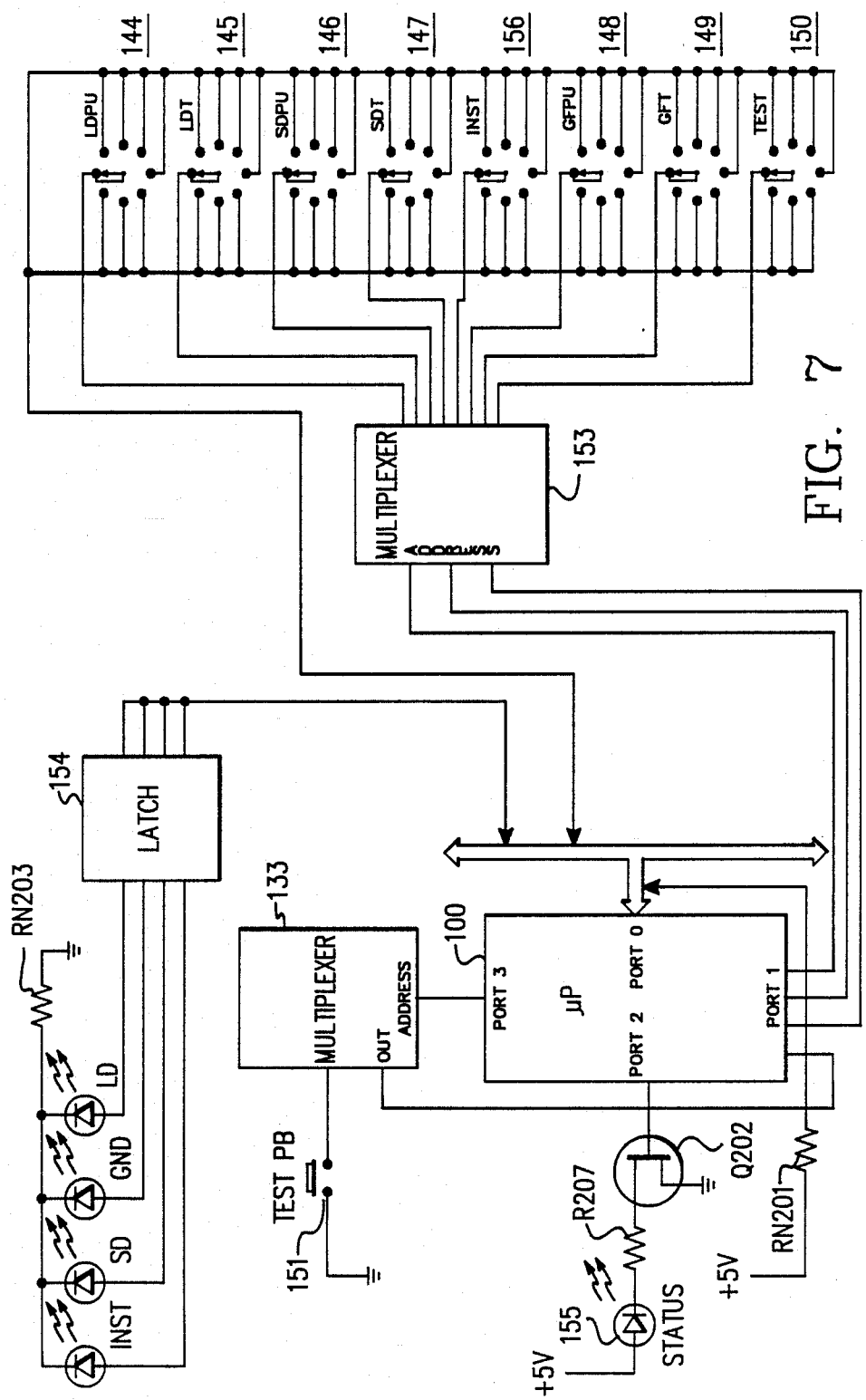
FIG. 7 is a detailed schematic diagram of the override circuit shown in FIG. 3.

As seen in FIG. 7, the plurality of factor selecting rotary switches 144 through 150 and 156 are coupled to the microprocessor 100 by way of the data bus, 101a. The wiper of each 8-position rotary switch can uniquely be pulled low through a rotary switch multiplexer 153. Depending on the position of the wiper, this logic "0" will appear on only one of the eight data bus lines. By this means, the microprocessor 100 can determine the wiper position of each of the eight rotary switches.

Also communicated over the data bus 101a is the information needed to activate one of four cause of fault LED's 140 through 143. This cause of fault information is coupled to a latching element 154 which is effective in the event of a circuit interruption causing a shutdown of the microprocessor 100, for maintaining activation of the cause of fault LED.

The test pushbutton 151 is effective when depressed for placing a low signal onto an input of the pushbutton multiplexer 133. When the pushbutton multiplexer 133 is addressed by a particular signal associated with the test pushbutton 151, output from the microprocessor 100, the actuation of the test pushbutton 151 is communicated to port 1, 101b of the microprocessor 100.

A status LED 155 is also disposed on the fault indicating and selecting portion 63a of the trip-unit segment 63 to indicate that the microprocessor 100 is operating properly. Associated with the status LED 155 is a status FET Q202 and an associated biasing resistor R207 connected in a conventional LED driving manner.

As seen in FIG. 7, a pull-up resistor network RN201 is tied to the data bus 101a, such pull-up resistor network RN201 being shown representatively as a single element but in fact including one resistor element for each of 8 data bus lines.

Figure 8:
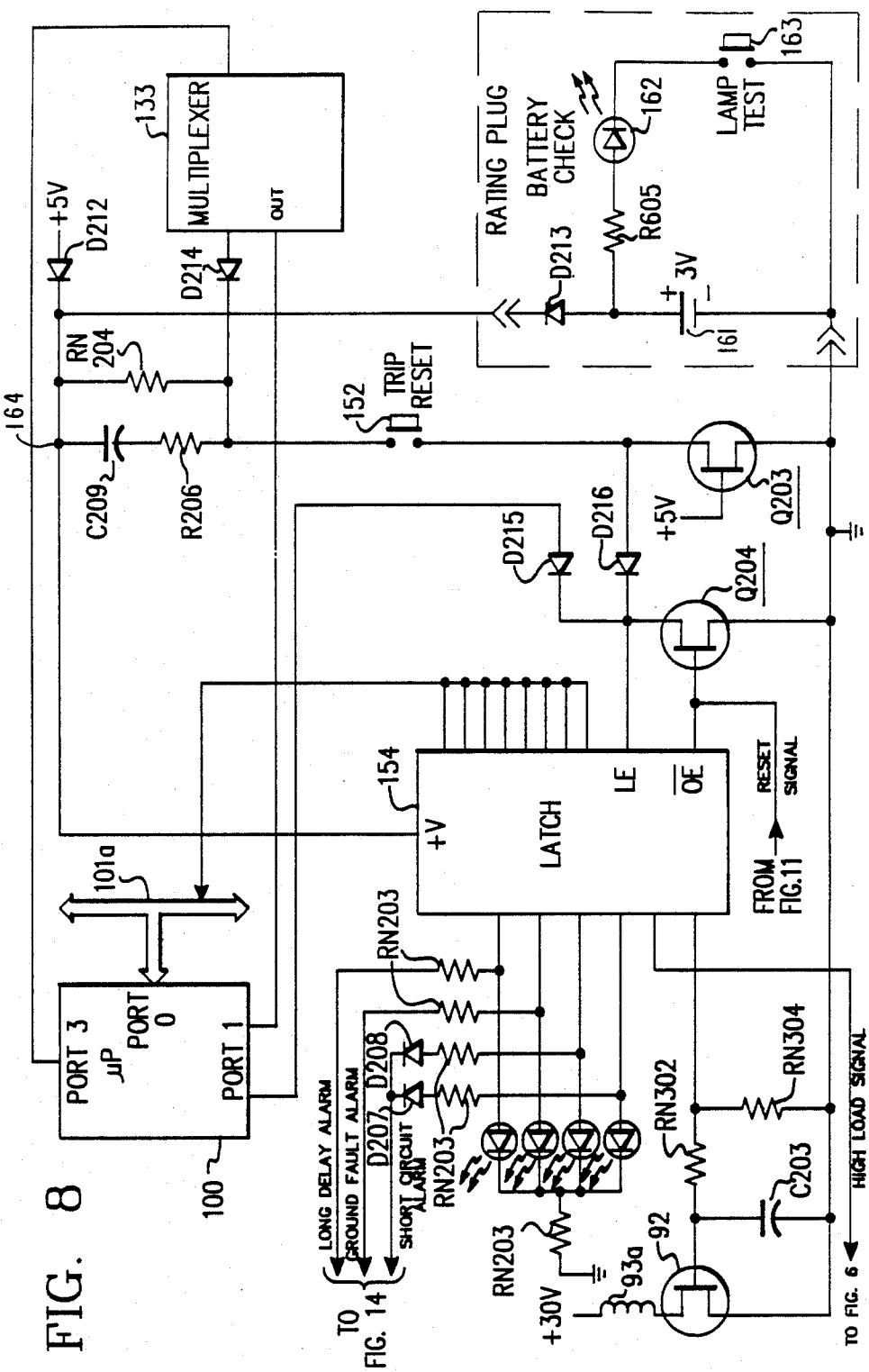
FIG. 8 is a detailed schematic diagram of the fault and panel input system shown in FIG. 3.

C. Back and Reset System of FIG. 8

The cause of fault LED's 140 through 143 provide the basic reporting means for delivery of information to the system operator informing him of the conditions of the electrical conducting circuit. In using LED's to indicate a cause of trip instead of the typical pop-up latching indicators which required no power, it is an inherent requirement that a source of power be available to power the cause of trip LED's 140 through 143 when the system power supply 77 which is driven by line currents, has collapsed. The backup and reset system shown in FIG. 8 accomplishes this task.

As previously discussed, the LED information for controlling the cause of fault LED's 140 through 143 is transmitted over the data bus 101a to the latching element 154 which holds the last transmitted input signal until that information is later changed.

Figure 14:
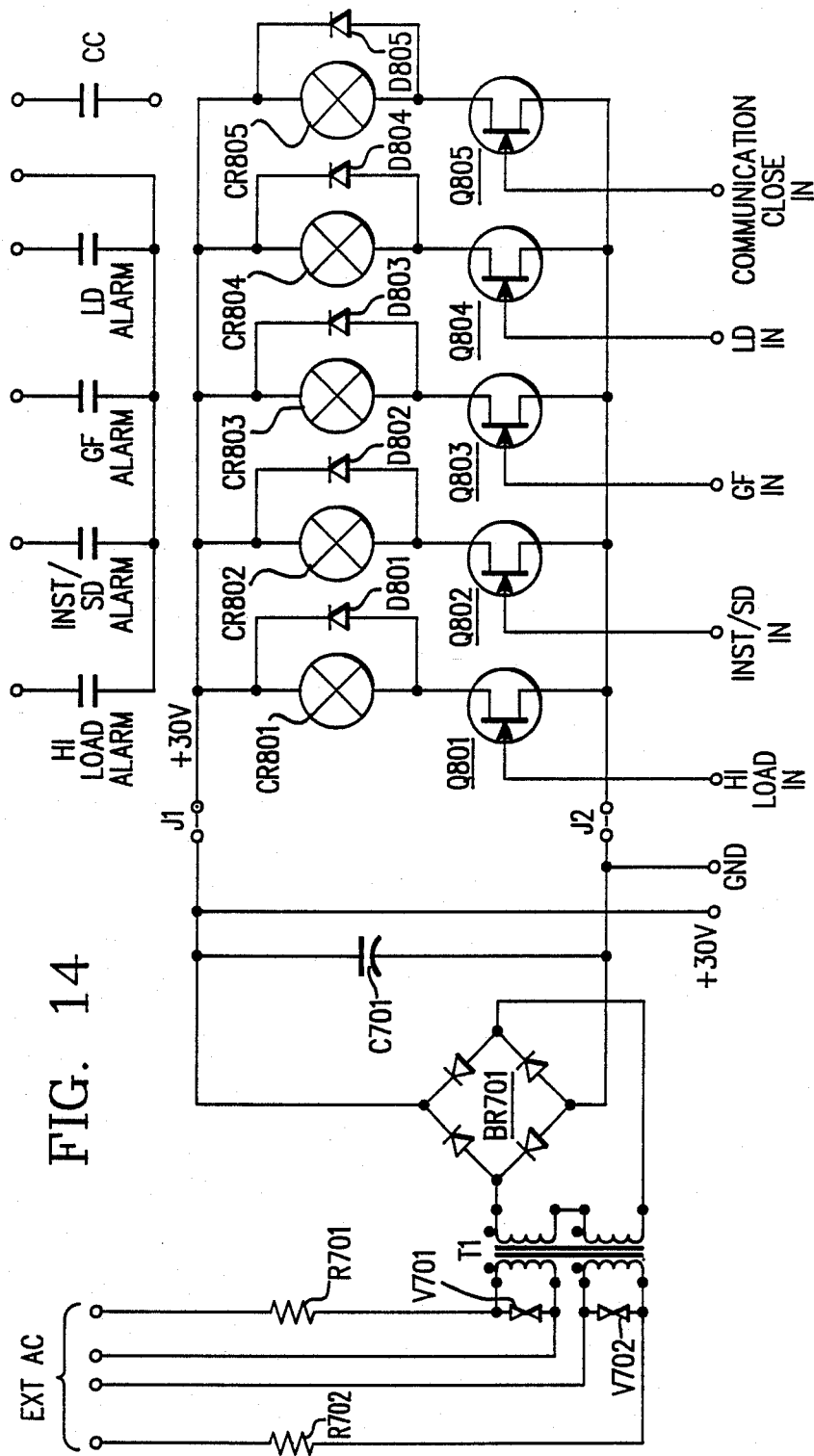
FIG. 14 is a detailed schematic diagram of the auxiliary power and alarm system shown in FIG. 3.

The latch output lines 160 which feed a high signal to activate any one of the cause of fault LED's 140 through 143, also communicates the high signal indicating the type of fault to a number of alarm elements which are shown in FIG. 14 as being part of the auxiliary power and alarm circuit 61 shown in FIG. 3. A long delay alarm signal is transmitted when a long delay trip condition has occurred, a ground fault alarm signal is transmitted when a ground fault trip condition has occurred, and a short circuit alarm signal is transmitted when either an instantaneous trip condition or a short delay trip condition has occurred, such two trip conditions being combined to form one alarm signal. These alarm signals are buffered by a resistor network RN203 and diodes D207 through D211 before they are communicated to the alarm circuits of FIG. 14.

Latch element 154 serves the purpose of driving the high load LED 130 which is lit when the solid-state circuit interrupter 60 senses a current in the electrical conducting circuit in excess of 85% of the maximum rated value. Additionally, the latch element 154 provides the latching of the trip signal thereover.

Once the tripping operation has been initiated, however, the output of the system 5-volt power supply 77b collapses due to interruption of the current from the current transformers 72 and 73. In order to maintain continued operation of the latching element 154 at all times including following a tripping condition, a power auctioneering arrangement is provided in the backup and reset system. The system 5-volt power supply 77b is auctioned with a separate fixed DC voltage source shown in FIG. 8 as being a battery 161 having a fixed DC voltage associated therewith which is lower in magnitude than the voltage output of the system 5-volt power supply 77b. In this manner, it can be appreciated that the auctioneering function, when the solid-state circuit interrupter 60 is operating under normal conditions, will always be biased in favor of the higher voltage associated with the system 5-volt power supply 77b. By so biasing the auctioneering function which includes a first auctioning diode D212 disposed on the supply line from the system 5-volt power supply 77b, and a second auctioning diode D213 disposed on the supply line from the battery 161, the storage capacity of the battery 161 is preserved and not depleted during normal operating conditions.

The battery element 161 along with the second auctioning diode D213 are disposed on the rating plug portion 63c of the trip-unit segment 63 shown in FIG. 5 so that when the battery 161 has worn down, a replacement can be installed without the need for disconnecting the solid-state circuit interrupter 60 which would be required to service an internally disposed element. In the present application, the battery used as a 3-volt lithium manganese dioxide watch-type battery capable of powering the cause of fault LED's 140 through 143 for up to fourteen days following the occurrence of a trip condition. It will be noted that other types of batteries are contemplated here as well as being within the scope of the present application.

Also disposed on the rating plug portion 63c in association with the battery element 161 is a battery check LED 162 and associated drive resistor R605. The battery check LED and drive resistor R605 are disposed in series with the battery 161 and with a lamp test pushbutton 163 which, when depressed, completes the path from the battery 161 to the battery check LED 162 to indicate the status of the battery 161.

During the transition from a normally operating condition to a tripped condition wherein the systems 5-volt power supply output is collapsing, it is necessary to prevent spurious bus activity from affecting the latch element 154 to the extent that a wrong cause of fault LED could be activated or even that a failure to activate any one of the cause of fault LED's 140 through 143 could occur. During this transition it has been noted that a false pulse could occur at the latch enable LE terminal of the latch element 154.

To prevent this false pulse from initiating a wrong or failed cause of fault indication, a FET transistor Q204 is connected across the latch enable terminal LE and an output enable terminal $\overline{OE}$ of the latch element 154 in such a manner that such spurious bus activity does not cause the activation of a wrong or failed cause of fault indication. The gate terminal of the FET Q204 is coupled to the $\overline{OE}$ terminal of the latch element 154 so that a reset signal, which proceeds the collapse of the system 5-volt supply, is effective for isolating the latch element 154 from the system 5-volt supply by acting upon the output enable terminal $\overline{OE}$ and, via FET Q204, upon the latch enable terminal LE.

A trip reset pushbutton 152 and associated reset circuitry is provided with the backup and reset system which, allows resetting of the latch element 154 so that the cause of fault LED's 140 through 143 can be extinguished.

An FET Q203 is connected having its drain and source terminals disposed in series with the system reset pushbutton 163, which pushbutton is a single-pole type. If the system 5-Volt supply is present, FET Q203 is gated ON thereby so that when the trip systemn reset pushbutton 163 is depressed, the cathode of a diode D214 is coupled to ground and a low signal is transmitted via multiplexer 133 which is recognized at port 1, 101b of the microprocessor 100. When the microprocessor 100 senses the reset signal as being low, a reset is invoked in the software and the trip condition is cleared so that a signal can be transmitted to the latch enable terminal LE over a dipole D215 thereby clearing the cause of trip condition display.

If the system 5-volt power supply has not yet been restored, it may still be desirable to clear the cause of fault indication. Depressing the trip reset pushbutton 163 causes a different signal path to be put into effect. This allows the cause of fault LED's 140 througuh 143 to be reset once the necessary information has been accumulated by the system operator; additionally, the system operator may wish to stop the operation of the optional alarms while he is servicing the fault condition. Since the system 5-volt power supply 77b is not available, FET Q204 is in an OFF condition. Additionally, the auctioneering feature of the backup and reset system has acted to couple the battery voltage to an electrical junction 164 whereby, when the trip reset pushbutton 152 has been depressed, a high signal is coupled in series from the battery element 161, through the electrical junction 164, through a resistor R206 and capacitor C209, over a diode D216, to the latch enable terminal LE of the latch element 154. A high pulse at the LE terminal therefore enables the latch element 154 to latch the inputs that it sees from the data bus 101a which, since the microprocessor 100 is unpowered, are low. These low inputs to the latch element 154 then translate to extinguishing the cause of fault LED's 140 through 143 and the associated alarms.

D. Plug Rating System of FIG. 9

Figure 9:
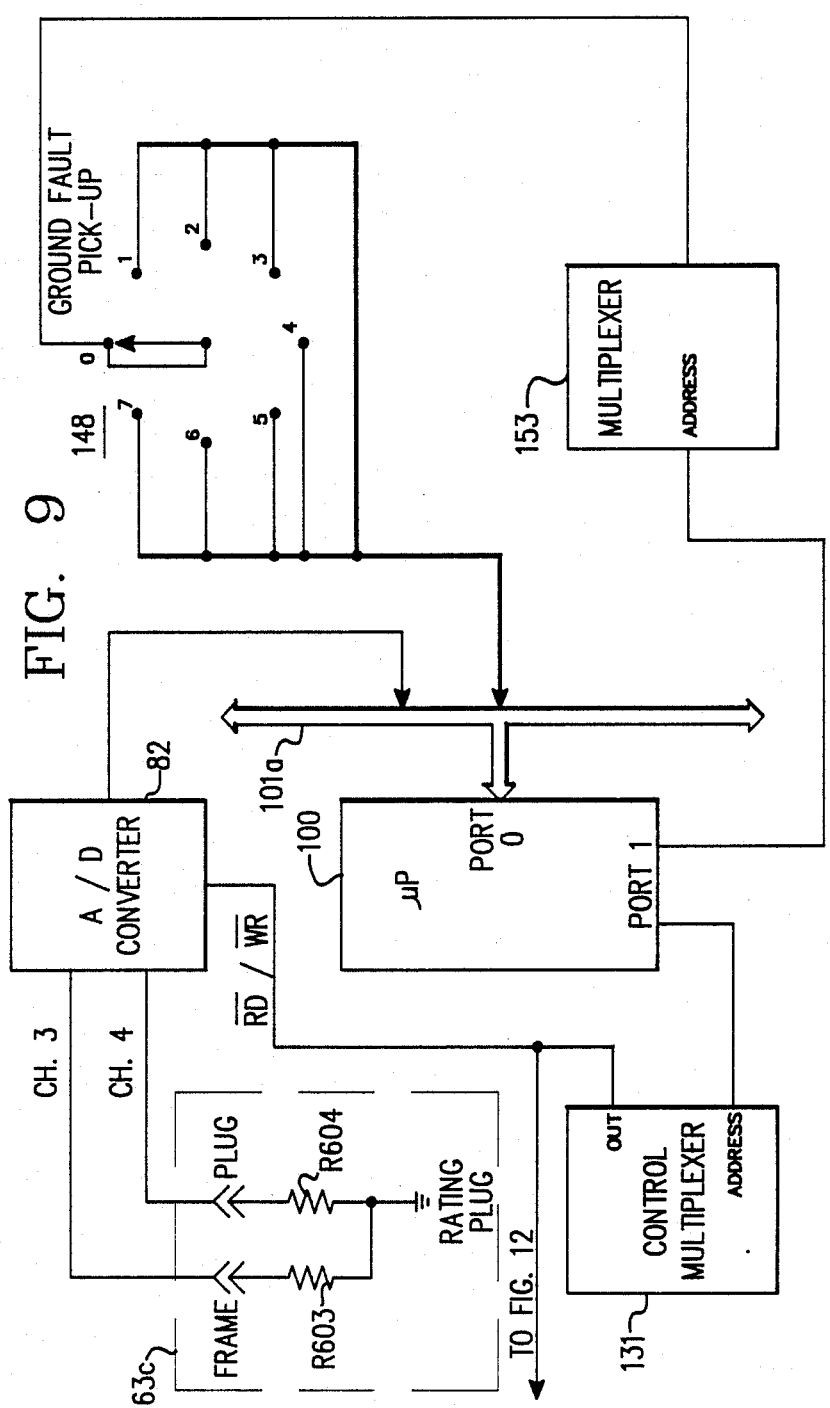
FIG. 9 is a detailed schematic diagram of the frame and plug rating system shown in FIG. 3.
Figure 19A:
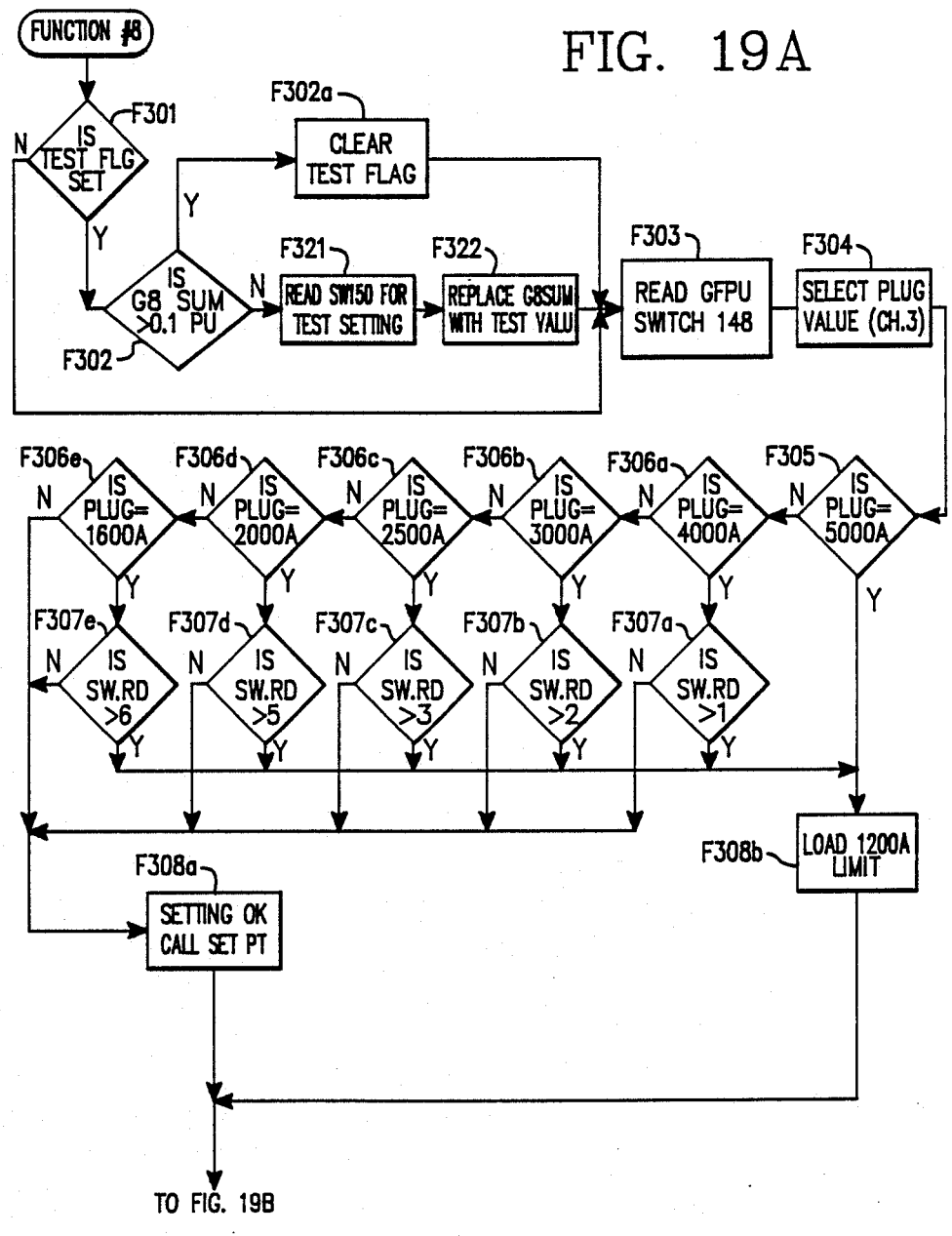
FIGS. 19A and 19B are flow charts for the third function of the main instruction loop shown in FIG. 16.
Figure 19B:
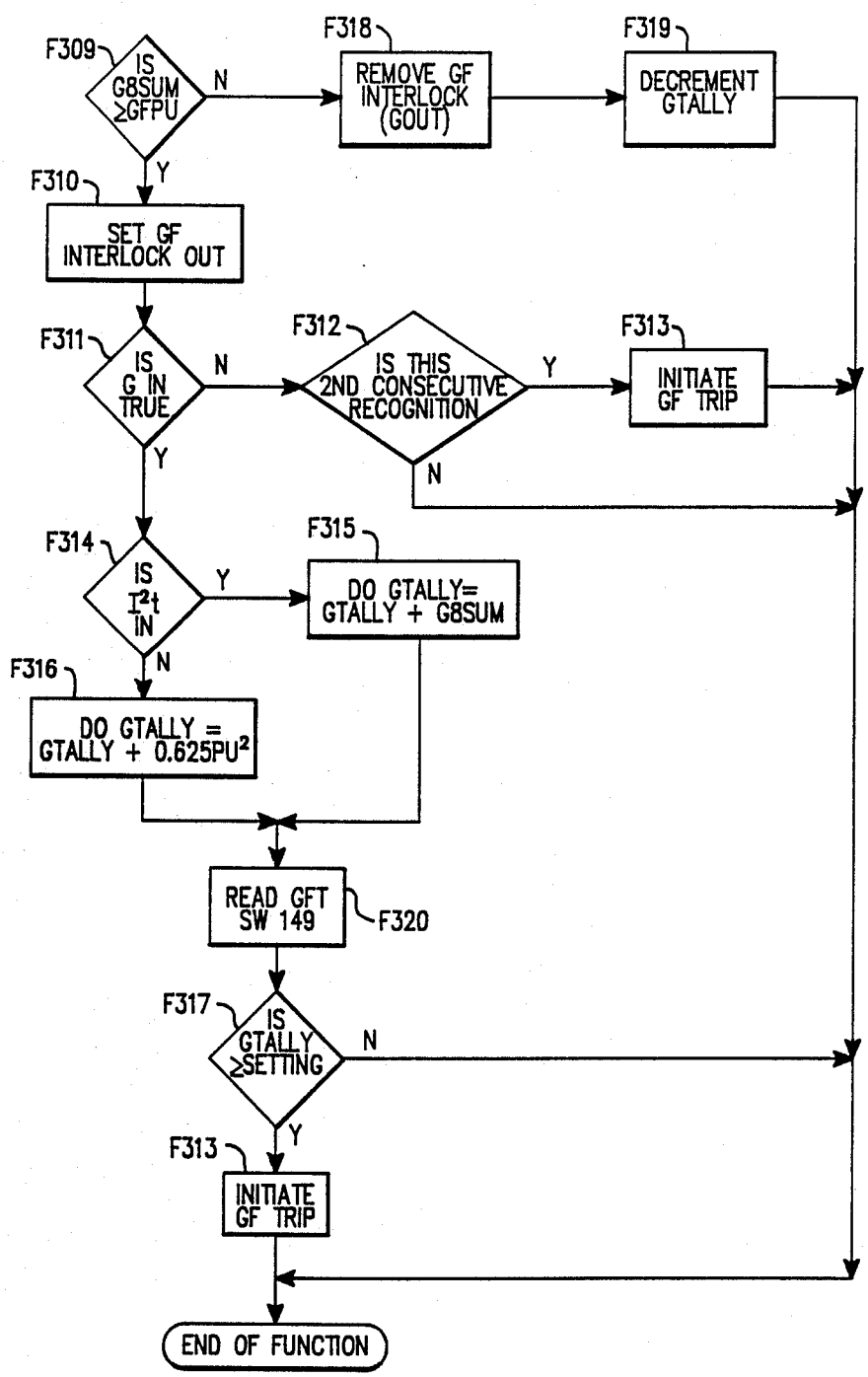

The plug rating system for the solid-state circuit interrupt 60 which establishes the maximum allowable ground fault current that can flow in a ground path associated with the electrical conducting circuit includes a hardware portion shown in FIG. 9 and a software portion represented in the flow chart shown in FIG. 19.

Figure 5A:
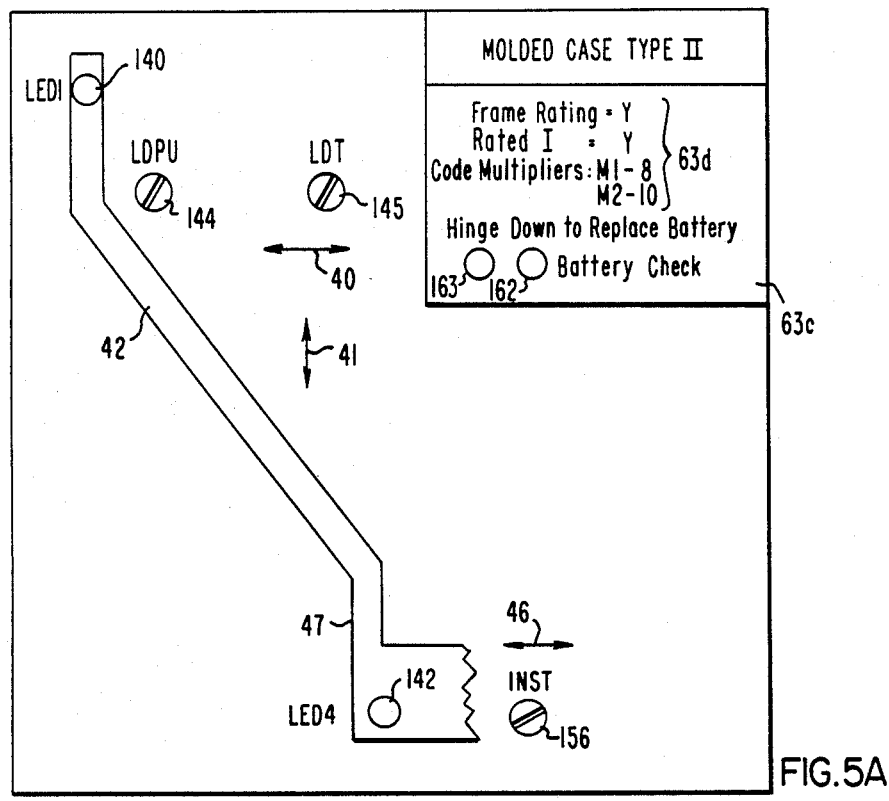
FIG. 5a is a detailed view of a first alternate front panel portion for the circuit interrupter shown in FIG. 2.
Figure 5B:
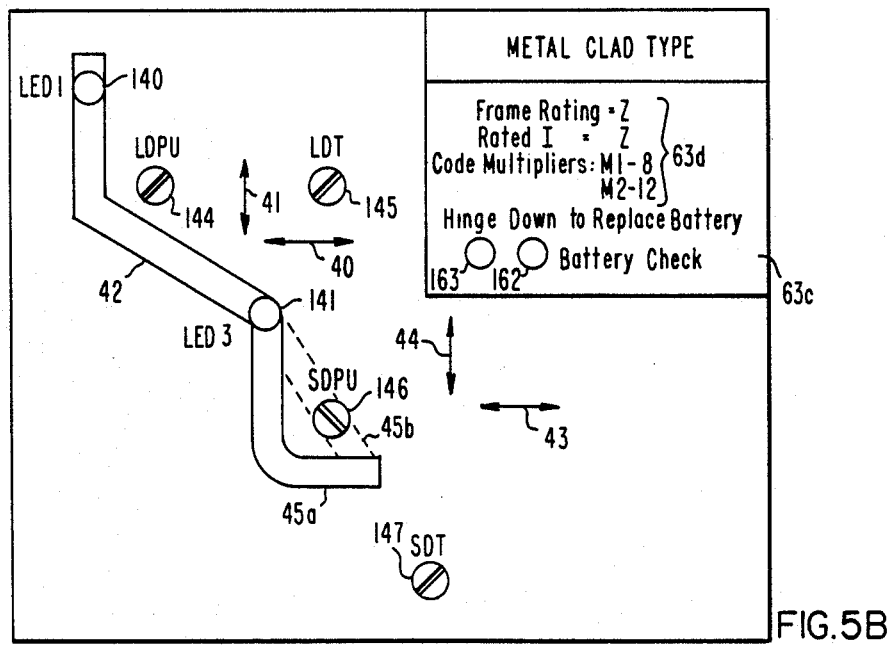
FIG. 5b is a detailed view of a second alternate, front panel portion for the circuit interrupter shown in FIG. 2.

Specification standards relating to maximum ground fault currents for circuit interrupts which can have breaker ratings ranging between 400 and 5,000 amps, have been established. Regardless of the breaker rating of the circuit interrupter, a UL/NEC specification standard has been set at 1,200 amps maximum. Additionally, as shown in FIGS. 5, 5A and 5B, there are various types of circuit interrupter constructions such as for instance, the molded case types and the metal clad types. For each of these, there is a requirement to maintain certain current limits which can be selected through the fault and panel system 88, such limits and related conditions as will be discussed hereinafter in further detail.

The trip unit 63 may be used with any of a number of different circuit interrupters from this range of breaker ratings. By installing the rating plug 63c in the trip unit 63, the user programs the full load current or breaker rating into the microprocessor 100. It will be noted that the rating plug 63c contains plug coding information 63d relating to the type of circuit interrupter being used and the code multipliers associated therewith. It should also be noted that any rating plug 63c can be utilized with any curve configuration and that the manner chosen was for illustration purposes only.

As seen in FIG. 9, which includes an enhanced illustration of the selecting arrangement for the GFPU factor previously shown in FIG. 7, two resistors within the rating plug 63c perform the function of establishing the breaker rating. Each resistor forms one-half of a resistor divider which produces a specific voltage at inputs CH. 3 and CH. 4 of the A/D converter 82. A first resistor, a frame rating resistor R603, characterizes the maximum capability of the circuit interrupter itself, such capability being commonly referred to as the frame rating. A second resistor, the plug rating resistor R604, characterizes the maximum capability of the load being protected which is typically less than the frame rating. The microprocessor 100 periodically performs A/D conversions on the CH. 3 and CH. 4 inputs and, based on the results, selects from internal tables, a value of current to be interpreted as the full load rating of the circuit interrupter 60.

The GFPU factor is manually selectable by the system operator to one of eight possible settings which are read by the microprocessor 100 over the data bus 101a. The particular information taken over the data bus 101a at this time is stored in one of the data memory registers 104 for use by a ground fault software subroutine in conjunction with the current value representing the full load rating.

Having accumulated the information concerning the selected GFPU factor and the rating plug value for the particular solid-state circuit interrupter, the ground fault subroutine shown in FIG. 19 must perform decisional operations before the selected GFPU factor can be acted upon by the main instruction loop, such decisional operations ensuring that the specification standards are not exceeded.

As seen in FIG. 19, the flow chart illustrating the operation of the ground fault subroutine first performs a decision regarding whether a test operation has been initiated by the system operator. The operational paths associated with the decision and with the decision as to whether the I²T type curve has been selected will be discussed hereinafter in further detail.

The decision as to what value will be used for the GFPU setting first requires loading the selected value for GFPU in one register as shown in function block F303, and loading the plug setting for the frame rating in another register as shown in function block F304. The ground fault subroutine then first decides whether the frame rating is equal to 5,000 amps, F305, and if so, the program proceeds to load a value of 1,200 amps for the GFPU setting irrespective of the selected GFPU setting.

If the response to decisional function block F305 is no, the ground fault subroutine then proceeds to ask for specific frame rating values until a yes decision is reached, such specific frame rating inquiries being shown as decisional function blocks F306a through F306e where decisional function blocks F306e asks whether the frame rating is 1,600 amps. If the response to decisional functional block F306e is o, it can therefore be deduced that the frame rating is selected as 1,200 amps or less so that whatever GFPU factor is selected, it is within the specification standards.

However, if the response to any of the decisional function blocks F306a through F306e is affirmative, a second level of decisional analysis must be pursued, this second level corresponds to a decision as to the allowability of the GFPU factor selected. The ground fault subroutine, upon finding that a frame rating in excess of 1,200 amps has been selected, must then verify that the GFPU factor selected, when multiplied by the frame rating, produces a result which does not exceed the 1,200 amp specification standard. For this purpose, the second level decisional analysis can result in either a verification of the selected GFPU factor; that is, allowing the one selected to be acted on by the main instruction loop, or a substitution of the 1,200 amp maximum ground fault rating can be made in place of the selected GFPU factor. The second level decisional function blocks F307a through F307e employ a tabling technique based on the setting of the GFPU rotary switch 148.

Once the ground fault subroutine has decided whether to use the selected GFPU factor or the substituted maximum GFPU factor, a further decision is made in regard to comparing the GFPU factor with the actual ground fault currents flowing in the ground path associated with the electrical conducting circuit. Such decision and further related decisions will be discussed hereinafter in further detail.

E. Override Circuit of FIG. 10

In addition to the previously discussed instantaneous protection, it is also required however of the solid-state circuit interrupter 60 that if a higher level of current flow is detected through the electrical conducting circuit than the instantaneous pickup level, such high level of current occurring possibly by introduction of a faulty wiring condition during installation, an immediate trip must be initiated. Such a feature is typically referred to as a hardware override protection and is provided for in the present application by the override circuit of FIG. 10.

Additionally, since the hardware override circuitry is associated with the frame rating withstand capacity of the solid-state circuit interrupter 60 as a whole and not just the trip-unit segment 63, it would be advantageous to locate the element or elements which determine the withstand rating of the contacts 93b apart from the trip-unit segment 63. The element that determines this withstand rating, which can be termed an override circuit pickup factor, is installed during the manufacture of the circuit interrupter frame since it is at this time that the override circuit pickup factor is established.

Figure 10:
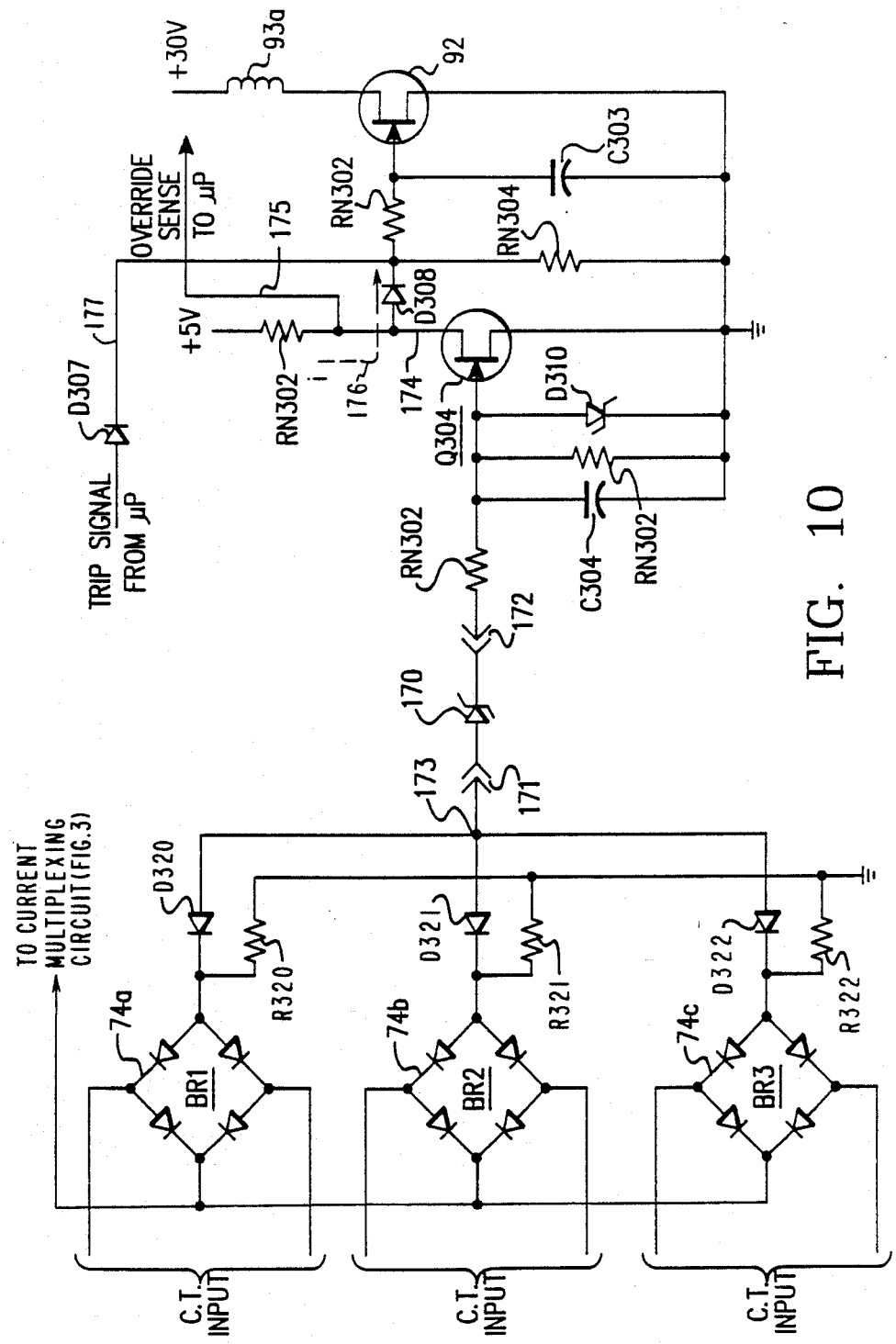
FIG. 10 is a detailed schematic diagram of the backup and reset system shown in FIG. 3.

As seen in FIG. 10, the element that establishes the override circuit pickup factor is a Zener diode 170 which has its anode terminal connected over a first plug terminal 171 to an electrical junction 173. The cathode terminal of the override Zener diode 170 is connected over a second plug terminal 172 to one resistive element of a resistor network element RN302. By so disposing the override Zener diode 170 between the two plug terminals 171 and 172, the override Zener diode 170 can be positioned at the one particular location within the solid-state circuit interrupter 60 which provides the greatest manufacturing and maintenance accessibility.

An override auctioneering arrangement which includes three negative voltage auctioneering diodes D317 through D319 produces an override signal at the anode terminal of the override Zener diode 170, which override signal is proportionate to the highest one of the phase currents flowing in the electrical conducting circuit. The override signal is a negative-going full wave rectified voltage analog of the highest phase current and is produced by the one bridge rectifier and associated current viewing resistor at which this highest phase current is detected. Three bridge rectifier circuits 74a through 74c and an associated 3 current viewing resistors R314 through R316 sample the phase currents from respective current transformers (not shown) and produce three individual override signals which the three auctioneering diodes D317 through D319 decide as to which is the largest.

The override Zener diode 170 is selected so that breakover occurs at the desired current level.

When the override Zener diode 170 is in a normal operating condition, that is when a breakover condition has not occurred, an override FET Q304 is biased so that current flows through a first current path 174. Elements C304, RN302, and D310 limit the magnitude of negative voltage that may be applied to the gate of override FET Q304 to within specification. The first current path 174 establishes a flow of current from the +5-volt supply through a resistive element of resistor network RN302, through the drain-source junction of the override FET Q304 and to ground. When the override FET Q304 is in an ON condition and current flows through its drain-to-source junction, a current flows through the first current path 174 so that the +5-volt level is substantially dropped across the resistive element of the resistor network RN302 and an overload trip signal is not conveyed to FET 92.

When an override condition has occurred so that the override Zener diode conducts, the gate-to-source junction of the override FET Q304 becomes negatively biased thereby turning OFF the override FET Q304. In this case, current flows through a second current path 176, which provides the flow of current from the +5-volt supply to the FET 92 via RN 302 and D308 coil 93a and causing a trip to occur. Resistor RN 304 and capacitor C303 are included for biasing purposes.

Tying into the second current path 176 at a point between the diode D308 and the gate terminal of the trip FET 92 is a software trip line 177 which has disposed thereon, a diode D307 biased in the same manner as diode D308, so that current can flow to the gate terminal of the trip FET 92. The software trip line 177 communicates the trip signal from the microprocessor 100 to the trip FET 92 when one of the trip unit protections has been put into effect.

When a hardware override condition has occurred, this fact must be communicated to the microprocessor 100 and this is done using the sense line 175. With the first current path 174 open by the fact that the override FET Q304 is in an OFF condition, current from the +5-volt supply is diverted to the second current path 176. The microprocessor 100 recognizes the occurrence of the override trip condition for display purposes.

F. Power Supply System of FIG. 11

Since the solid-state circuit interrupter 60 includes not only electronic circuit elements that require a +5-volt DC source for normal operation, but also components that operate at higher voltage levels as for instance the trip coil 93 which requires a +30 volts DC source and the calibration elements 81 and 83 which require a +16-volt DC source, the trip-unit segment 63 also includes power supply circuitry which can provide essentially all of the operating voltages necessary for the solid-state circuit interrupter 60 provided that an input source is available.

Figure 11:
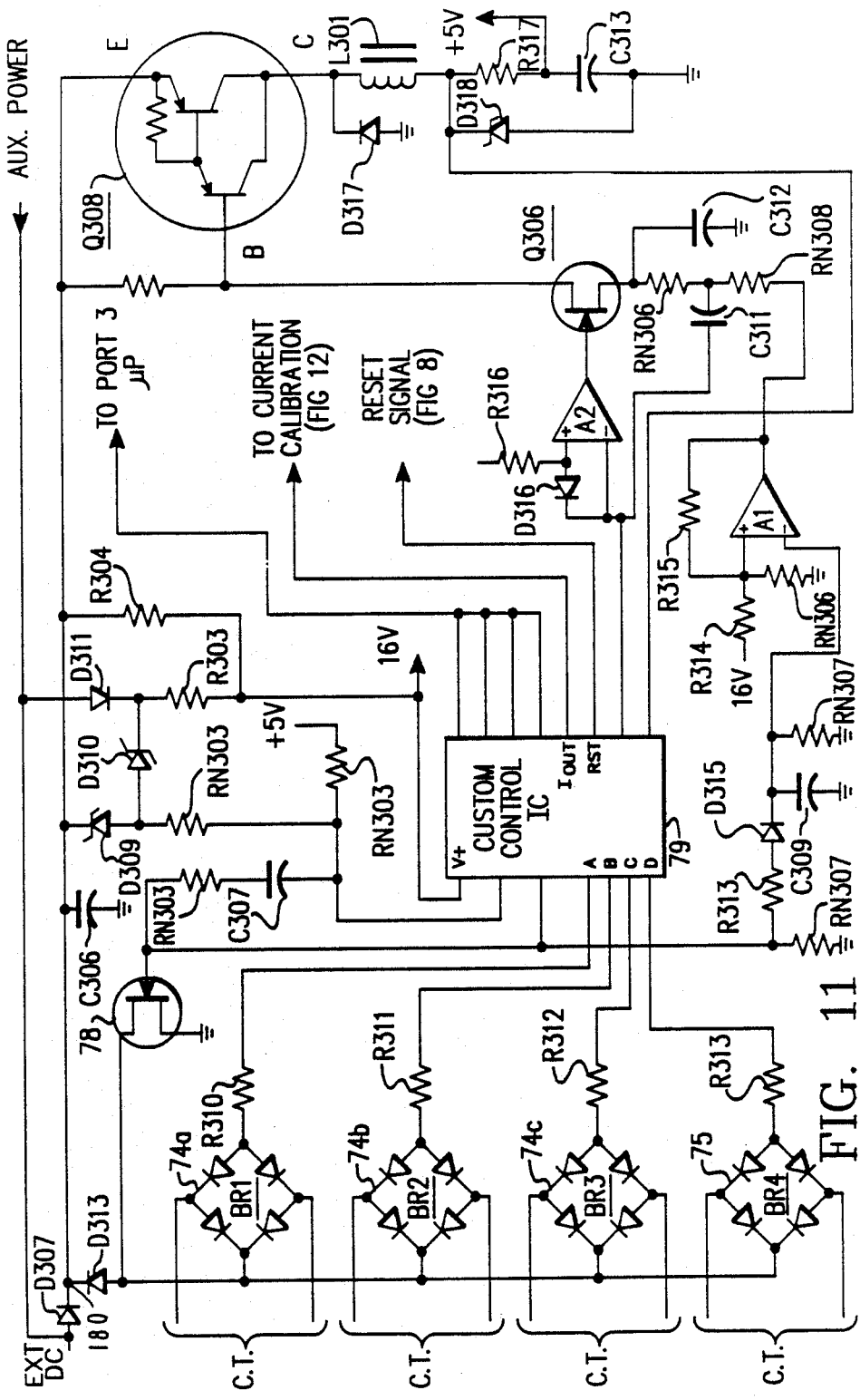
FIG. 11 is a detailed schematic diagram of the power supply circuits shown in FIG. 3.

This input source is typically one supplied from the line phase currents which are coupled to the trip-unit segment 63 by means of the current transformers 72 and 73. A number of full wave bridge rectifiers corresponding to the number of phases in the electrical conducting circuit, plus one additional full wave bridge rectifier for the ground current, are provided in the power supply circuitry as the primary input source. As shown in FIG. 11, for a 3-phase system, a total of four full wave bridge rectifiers are needed, these being referenced as BR1, BR2, BR3, and BR4.

Once the phase and ground currents are full wave rectified, they are summed at the anode of a summing diode D313. The summed currents are then utilized for charging a capacitor C306 to 30 volts DC, the charging of which is shunt regulated by shunt regulating FET 78 which is under the control of the shunt control portion 79b of the multi-purpose custom IC 89. The shunt regulating FET 78 is gated ON when it has been detected that the capacitor C306 has been charged to the requisite +30-volt DC level. With the shunt regulating FET 78 gated ON, the summed currents from the full wave bridge rectifiers are shunted to ground and the capacitor C306 cannot then be charged to a level in excess of the 30-volt DC level.

A source junction point 180 connects not only the primary input source of the summing diode D313 to the capacitor C306 but also brings in secondary input sources such as an external DC source and an auxiliary power source over diode D307. The primary and secondary input sources are auctioneered at the source junction point 180 so that the highest one of the input sources can charge the capacitor C306.

The shunt control portion 79b of the multi-purpose custom IC 79 utilizes inputs from a shunt control circuit to monitor the necessary voltage levels. This shunt control circuitry includes components diodes D309, D310 and D311, resistors R303 and R304 and resistive elements associated with resistor network RN303 as well as a capacitor C307 arranged in a manner whereby specific voltage levels are input to the multi-purpose custom IC 79 so that the custom IC 79 can regulate the operation of the shunt regulating FET 78 thereby. Additionally, at the junction of resistors R303 and R304, a supply of +16 volts DC is available. This application therefore utilizes the multi-purpose custom IC 79 to perform the functions of monitoring the operating voltages and controlling the charging of a capacitor, such functions as can also be accomplished by a conventional comparator circuit, which circuit is also contemplated as within the scope of the present application.

Additionally, upon sensing the proper operating voltages at the capacitor C306 and at the inputs from the shunt regulating circuitry, the multi-purpose custom IC 79 is further effective for controlling the operation of a +5-volt chopper regulated power supply 77b. The chopper regulated power supply shown in FIG. 11 within the dashed area and designated reference 77b is made up of amplifiers A1 and A2 and their associated biasing components, chopper regulating transistor pair Q308 with associated biasing components, and associated regulating and filtering components, inductor L301, diodes D317 and D318, resistor R317 and capacitor C313 and FET Q306.

In this instance, the multi-purpose custom IC 79 is effective for enabling the output of the chopper regulated power supply 77b only when the operating voltage at the capacitor C306 as it is at the requisite +30-volt DC level. In this application, however, the control of the chopper regulated power supply 77b is accomplished using the same signal as controls the shunt regulating FET 78. In other words, the signal level achieved by the shunt regulating circuitry under the control of the multi-purpose custom IC 79 that gates ON the shunt regulating FET 78 to maintain a +30-volt charge level at capacitor C306, also enables operation of the chopper regulated power supply 77b.

It can therefore be appreciated that the type of power supply that is utilized for providing a +5-volt DC operating voltage for the electronic components of the solid-state circuit interrupter 60 is not a critical factor, only that the +5-volt DC output is available when the proper operating voltages of the system are present. Additionally, the multi-purpose custom IC 79 is not in and of itself a critical factor to the operation of the solid-state circuit interrupter 60. As previously discussed, a separate electronic circuit using a number of distinct electronic components can be substituted for the multi-purpose custom IC which would provide the functional characteristics of monitoring the output voltages and providing a single signal to control the charging of a capacitor and the enabling of a +5-volt DC power supply.

G. Calibration and Selection Circuitry of FIG. 12

The phase and ground currents, which in FIG. 11 were discussed for their use in charging capacitor C306 and sourcing the system power supply 77, are also coupled through a current multiplexing portion 79a of the multi-purpose custom IC 79 for providing conditioned signals which the microprocessor 100 selects and samples to apply in the various protection subroutines of the main instruction loop.

Figure 12:
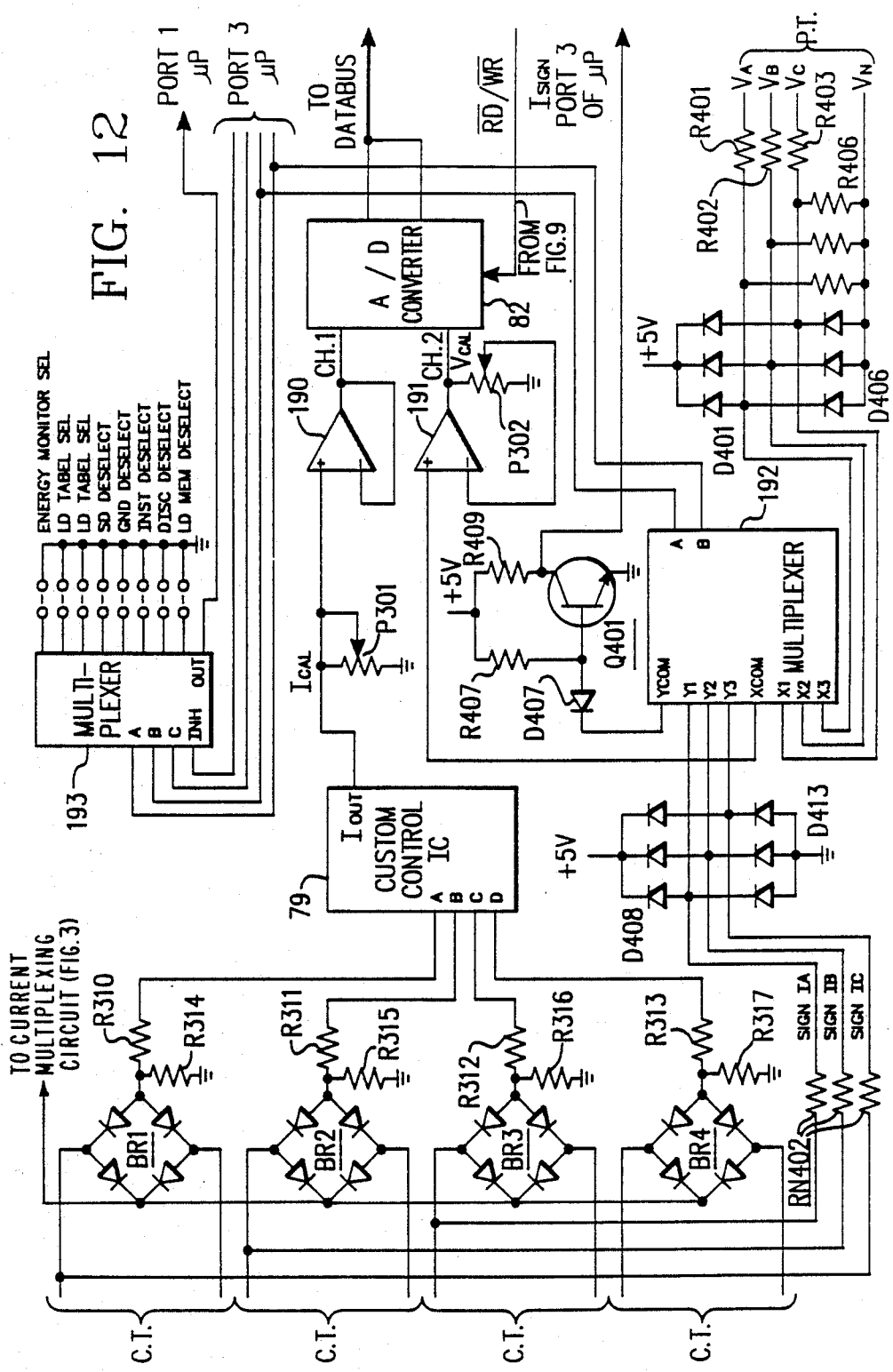
FIG. 12 is a detailed schematic diagram of the current and voltage calibration and conversion circuits shown in FIG. 3.

As seen in FIG. 12, the phase and ground currents are coupled from the current transformers 72 and 73 to the four full wave bridge rectifiers BR1 through BR4. Each current completes the return path to its secondary winding (not shown) via current viewing resistors R314 through R317 and in so doing, produces a negative-going full wave rectified voltage analog of itself. Each of these voltage analog signals is then reconverted to a current value via resistors R310 through R313 and is presented to inputs of the current multiplexing portion 79a of the multi-purpose custom IC 79. The current multiplexing portion 79a is controlled by way of a selection code transmitted over port 3, 101c of the microprocessor so that, when commanded by the microprocessor, the current multiplexing portion 79a outputs a single value at terminal IOUT which is proportionate to the current at one of its inputs. The microprocessor 100 also designates that a greater range of input current can be digitized by the analog-to-digital converter 82 with the final current value being rescaled back to its true value internally.

The current output of the current multiplexing portion 79a is coupled to a current calibration circuit 81, which includes a current calibrating potentiometer P301 and a current calibrating amplifier circuit A3 designated as reference number 190. The output of the current calibrating amplifier 190 is designated channel 1 and is input to the analog-to-digital converter 82.

Designated channel 2 and also input to the analog-to-digital converter 82 is a voltage signal which is output from the voltage calibrating circuit 83. The voltage calibrating circuit includes a voltage calibrating potentiometer P302 and a voltage calibrating amplifier A4 designated as reference number 191. The signal which the voltage calibrating circuit 83 acts upon is input thereto as a multiplexed line-to-neutral voltage, such value of which is necessary in calculating real power and energy associated with the electrical conducting circuit.

A sign and voltage multiplexing element 192 receives the line-to-neutral voltages of each of the phases of the electrical conducting circuit. Resistors R401 through R406 form three voltage dividing circuits which, along with diodes D401 through D406, function to limit the line-to-neutral input signals and form a conditioning circuit through which the line-to-neutral voltages must pass before being input to the three input lines of the sign and voltage multiplexer 192. The sign and voltage multiplexer 192 outputs a multiplexed voltage signal to the voltage calibrating circuit 83 upon receiving a proper selection code from the microprocessor 100. The code transmitted from port 3, 101c of the microprocessor 100 samples the line-to-neutral voltage of a particular phase simultaneously to sampling the sign of the current of that phase.

The inputs to the sign and voltage multiplexer 192 are taken from the output of the current transformers 72 at a point before the respective full wave bridge rectifiers associated with each of the three phases. These sign signals are decoupled and limited by way of a coupling and limiting resistor and diode arrangement shown in FIG. 12 as including resistive elements of the resistor network RN402 and diodes D408 through D413.

The sign signal output by the sign and voltage multiplexer 192 is communicated to a digitizing circuit arrangement which provides a digital high or low signal indicating the sign of the current, such digitized signal being input to port 3, 101c of the microprocessor 100. This digitizing circuit includes an NPN transistor Q401 and associated biasing components, resistors R407 and R409 and diode D407.

Inasmuch as the real power and energy are needed only when the display board system shown in FIG. 6 has been selected as an option, the sign and voltage multiplexer 192 and associated circuitry are optional equipment and are, in fact, separate as well from the display board system. The solid-state circuit interrupter 60 can be configured having the optional display board system with the energy and power circuitry shown in FIG. 12, or it can be configured without this circuitry. The sign and voltage multiplexer 192 and associated circuitry are, in fact, disposed with the communication circuit and input segment 62 shown in FIG. 2.

A selection multiplexer 193 is also shown as being a part of the calibration and selection circuitry of FIG. 12 and is effective for allowing the manufacturer of the solid-state circuit interrupter 60 to deselect options which the user does not purchase with the solid-state circuit interrupter 60. The selection multiplexer 193 is shown having seven selection options which are selectable or deselectable by use of jumpers J301 through J307. The options shown as being deselectable are: short delay projection ground fault protection, instantaneous protection, discriminator protection, long delay memory deselection, in addition to a jumper selection as to which table to use for the long delay protection feature.

As shown in FIGS. 5B and 5C, all of the possible protections need not be selected for every application of the solid-state circuit interrupter 60. When a certain solid-state interrupter application requires only the long and instantaneous trip protection features, as is true in the example shown in FIG. 5B, a panel section is utilized which shows only the long delay curve portion and the instantaneous curve portion 47. In this instance, the short delay protection would be deselected by inserting a jumper at J303.

FIG. 5C illustrates the situation where only long and short delay protection is required thereby resulting in the deselection of the instantaneous trip protection by insertion of the J305 jumper. The selection of the long delay memory feature allows for the decrementing of a long delay tally factor upon sensing a condition below the long delay pickup factor, such long delay memory feature as will be described hereinafter in further detail.

In contrast to the voltage calibration and sign information transmitted over the sign and voltage multiplexer 192, the selection information is not an optional feature and is, in fact, a circuit associated with the required power supply circuit board.

H. Communication System of FIG. 13

In configuring an electrical distribution system having a number of solid-state circuit interrupters 60, it is advantageous to communicate as much information between the solid-state circuit interrupter and a central control location (not shown) as possible, as well as communicating such information with adjacent solid-state circuit interrupter 60 whose operations could impact upon each other as previously pointed out in the discussion of the zone interlocking arrangement.

Figure 13:
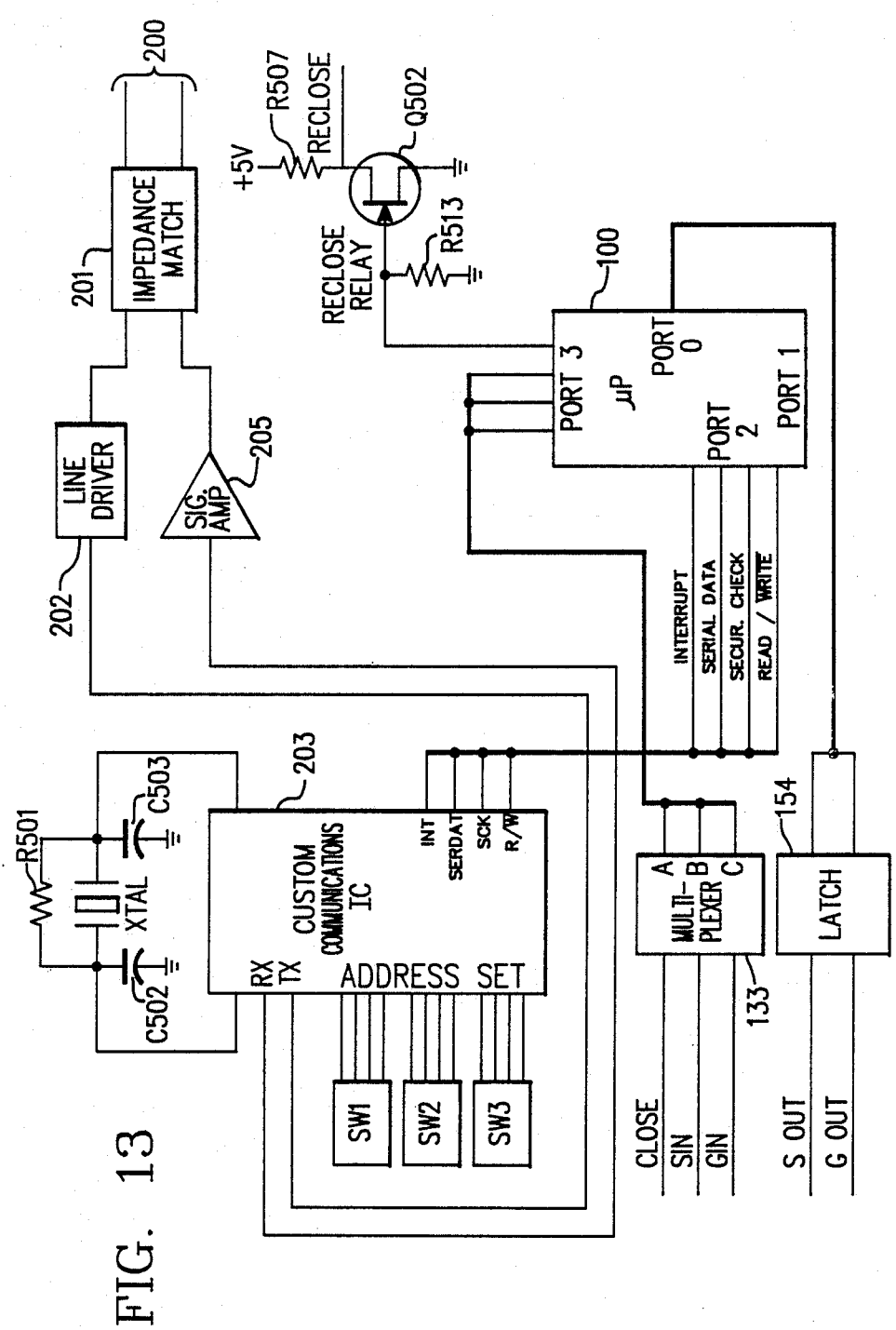
FIG. 13 is a schematic diagram partly in functional block form of the communication system shown in FIG. 3.

In order to have the solid-state circuit interrupter 60 communicate with the central control location which is remote from the solid-state circuit interrupter, and which performs functions of load monitoring and load shedding, the communication system shown in FIG. 13 provides a two-line wire communications arrangement 200. An impedance matching circuit 201 couples the communication system shown in the dashed area of FIG. 13 as reference 86, to the line wires 200 with minimum signal loss or distortion. A line driving circuit 202 conditions the incoming communication signal so that the communication signal may be acted upon by the custom communications IC 203. Similarly, an amplifier circuit 204 conditions the communication signal which is output from the custom communication IC 203 so that this communication signal may be transmitted over the line wires 200 to the central control location (not shown).

The custom communication IC 203 is a self-contained communication circuit whose function can also be realized with discrete components. It can be appreciated that such an embodiment can be utilized in place of the custom communications IC 203 without departing from the scope of this application. An external oscillator arrangement 204 is illustrated which defines the frequencies to which the solid-state circuit interrupter 60 will respond.

The custom communications IC 203 can be programmed via a 12-bit address selection code established by way of the shown three BCD switches SW1 through SW3 so that each solid-state circuit interrupter associated with the electrical distribution system can be assigned a unique address code and thereby communicated with accordingly. The BCD switches SW1 through SW3 thereby program the custom communications IC 203 so that only upon recognition of its distinct address code in the incoming communication signal, will information be communicated to the microprocessor 100.

The custom communication IC 203 is effective for demodulating the incoming communication signal and deriving a digital message therefrom which is read by the microprocessor 100 over a serial data input to port 2, 101c under command of a communication read/write signal. Also communicated between port 2, 101c of the microprocessor and the custom communication IC 203, is an interrupt signal and a security check signal. The security check signal allows the microprocessor 100 to verify the integrity of the incoming digital message and to reject that message when an error in communications has occurred such as can occur from a noise burst on the communications line. Various types of security schemes are utilized for this purpose and are contemplated as being within the present application, an example of which is BCH error detection.

The microprocessor 100 has the ability to reclose the breaker upon receiving a remote command over the custom communication IC 203. A signal inverting FET Q502 and associated biasing elements R507 and R513 provide the capability to drive the signal needed to close a reclose relay CR805 shown in FIG. 14.

A close signal, which confirms the status of the main contacts (not shown) of the circuit interrupter, is multiplexed as an input of port 1, 101b of the microprocessor 100.

Also communicated to the microprocessor 100 are the zone interlocking signals SIN and GIN which inform the microprocessor 100 associated with this particular solid-state circuit interrupt 60, that a fault condition has been sensed by another solid-state circuit interrupter. As previously discussed, the SIN signal indicates a short circuit condition and the GIN signal indicates a ground fault condition has occurred and was detected by a downstream circuit interrupter.

Similarly, zone interlocking signals SOUT and GOUT are generated by this particular solid-state circuit interrupter 60 and are communicated to other solid-state circuit interrupters to indicate that this particular circuit interrupter will initiate an interruption to clear the fault condition. The SOUT and GOUT signals are communicated over the latch element 154 upon receipt of this information from the data bus 101a and the enabling of the latch element 154.

I. Auxiliary Power and Alarm System Module of FIG. 14

As an optional feature, an auxiliary power supply and alarm circuit module 61 provides a source of unregulated 30-volt DC power from a 120/240 VAC, 50/60 hz input power source.

As seen in FIG. 14, this external AC input is coupled to the primary windings of a step-down transformer T1. The secondary windings of the transformer T1 are coupled to a full wave bridge rectifier BR701, the output of which is filtered by capacitor C701 so that the unregulated 30-volt DC voltage can be made available at the +30 V and GND terminals associated with the auxiliary power supply 61.

Also included in the auxiliary power supply and alarm circuit module 61 shown in FIG. 14 are a plurality of relay elements designated CR801 through CR805. The +30-volt DC level developed by the auxiliary power portion is coupled to one side of each of the relay elements. In order to energize one of the relay elements CR801 through CR805, each of which are associated with specific operating or fault conditions such as, a high load condition; a short circuit condition; a ground fault condition; and a long delay interrupt condition, a signal must be received from the latch element 154 shown in FIG. 8. Upon receipt of a high signal from the latch element 154 indicating the occurrence of such a fault or operating condition, an FET associated with that particular relay element CR801 through CR805 is gated ON thus allowing the coil of that relay element to be energized. A current recirculating diode D801 through D805 is associated with each of the coil elements.

The contacts of the relay elements CR801 through CR805 are shown in FIG. 14 according to the alarm or operating condition that they indicate, and can be used, for example, to drive a remote device notifying the system operator of a fault or specific operating condition.

It will be noted that the reclose relay CR805 and associated close contact previously described with reference to the communication circuit of FIG. 13 is disposed here on the auxiliary power supply and alarm circuit 61.

IV. OPERATIONAL DESCRIPTION

A. Main Instruction Loop of FIG. 16

Figure 16:
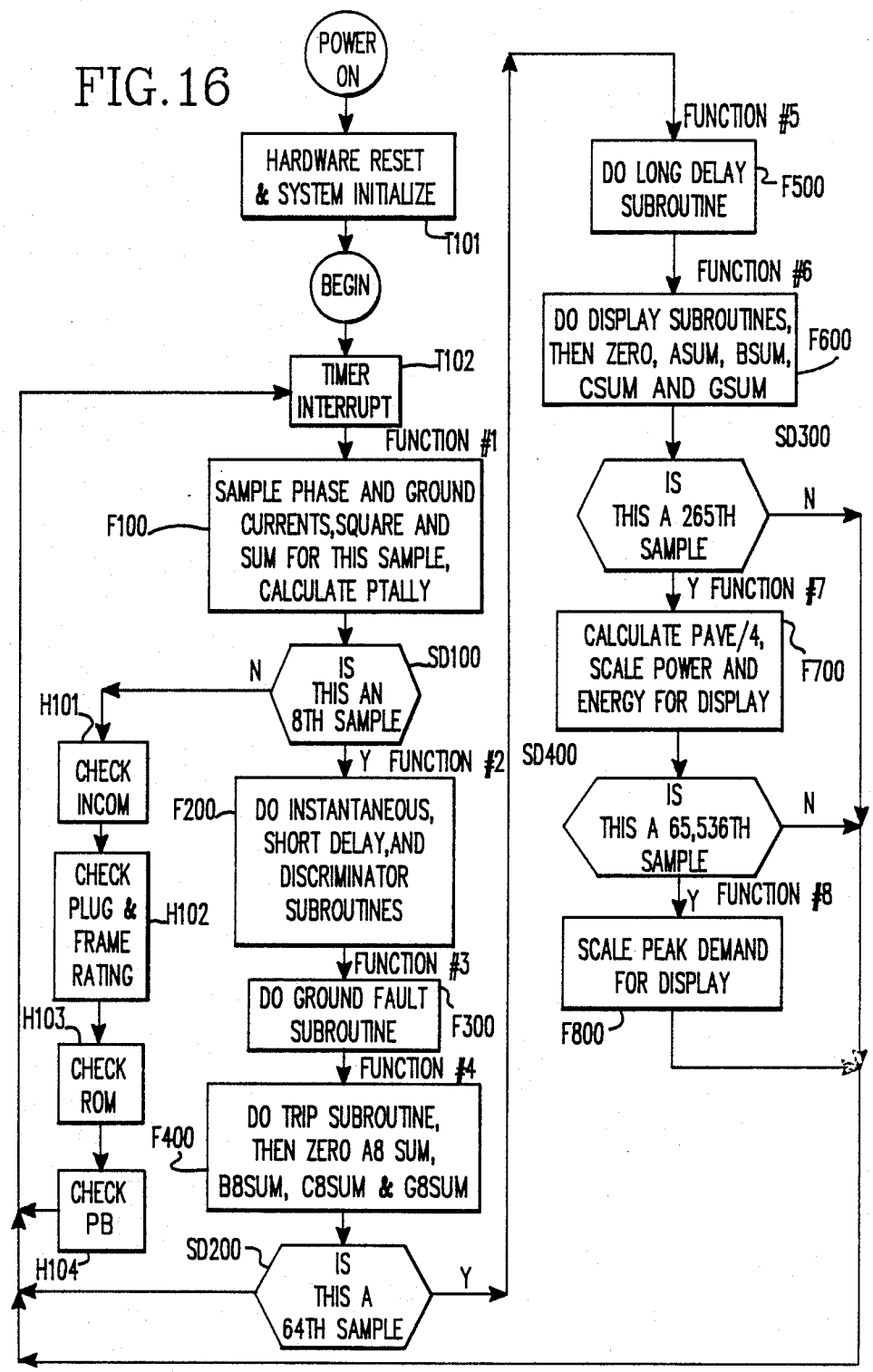
FIG. 16 is a system flow chart for the main instruction loop stored in the memory of the microprocessor shown in FIG. 3.

The operation of the solid-state circuit interrupter shown in FIG. 2 will be now presented with particular reference to the main instruction loop followed by a specific reference to the individual function blocks detailed in FIG. 16.

The main instruction loop shown in FIG. 16 illustrates not only the types of operation performed within the microprocessor-based solid-state circuit interrupter 60 but also, the sequence in which these operations are performed. From the point of initially connecting power to the solid-state circuit interrupter 60, to the completion of the 65,536th sample step, all instructions within the main instruction loop follow the preselected sequence that allows for the provision of instantaneous protection, discriminator protection, short delay protection, long delay protection, and ground fault protection all in a timely manner to prevent damage to the load device.

As seen in FIG. 16, upon recognizing a power-up condition, the main instruction loop executes all necessary hardware reset and system initialization operations, which include but are not limited to initializing the ports and registers, this reset and system initialization operation being shown as reference T101 of FIG. 16.

The main instruction loop then waits for a timer interrupt operation which is shown as function T102. At this time, a verification as to whether the solid-state circuit interrupter 60 is to operate at a 50 or a 60 hz frequency, which is set during the manufacturing stage, is made so that a basic sampling period can be established. This basic sampling period is the time between successive sets of samples of current and voltage for each of the phases.

As previously discussed, it is necessary to be able to initiate a tripping operation within a very short time typically on the order of 50 milliseconds from the occurrence of an overcurrent condition in order to prevent damage to the electrical distribution system. Counterbalancing this is the need to perform sufficient sampling and calculating operations on the conditioned signals to ensure that an accurate determination as to whether to initiate a trip or not has been made. Also, realizing that in coordinating between the sampling frequency and the frequency of the sample wave form, a 1 Hz beat frequency must be accounted for, which in the case of 60-Hz signal requires an additional 16.67 milliseconds, the sampling and calculating operations must therefore occur within approximately 33.33 milliseconds after the occurrence of the overcurrent condition. The present solid-state circuit interrupter 60 can also be configured to operate at a 50-Hz frequency which simply requires a recalculation of the 1-Hz beat frequency time period, such configuration also being contemplated as within the scope of the present application.

In selecting the proper number of current sampling and calculating operations, it has been determined that eight samples would provide an accurate determination of whether an overcurrent condition exists. The selecting of the frequency for the external timing device 109 shown in FIG. 15 can be calculated knowing the number of operations needed to execute that portion of the main program loop to reach eight samples.

Though the above selection of eight samples constitutes the preferred sampling scheme, it can be appreciated that other sampling rates and external timing frequency selections can be made without departing from the scope of the present application.

From the timer interrupt function T102, the main instruction loop proceeds to the first main program function designated F100 which includes the execution of subroutines for sampling the phase currents and voltages, squaring and summing the magnitudes of the sampled current values, and calculating a tally of the power used.

After completing the above subroutines associated with the first main program function 100, the main instruction loop performs a first sample decision designated SD100. This first sample decision SD100 asks whether 8 samples have been completed. If this is not an 8th sample, the main instruction loop executes a series of housekeeping chores which include checking the INCOM communication link IC 203 H101, checking the plug and frame rating values H102, conducting read only memory (ROM) self-check H103, and checking the status of the various pushbuttons H104 of the solid-state circuit interrupter 60.

If it has been determined that this is an 8th sample, the main instruction loop proceeds to execute the second main program function designated as F200, which includes executing an instantaneous protection subroutine, a short delay protection subroutine, and the discriminator subroutine.

Following completion of the second main program function F200, the main instruction loop proceeds to execute the third main program function designated F300, which includes executing the ground fault protection subroutine.

Upon completion of the third main program function F300, the main instruction loop proceeds to execute the additional housekeeping chores designated F400 which includes execution of the trip subroutine followed by a subroutine which zeros the accumulated sums for the phase and ground currents taken for the previous eight samples.

Following execution of the fourth main program function F400, the main instruction loop proceeds to execute a second sample decision designated SD200 which asks whether 64 samples have been completed. If the present sample is not a 64th sample, the main instruction loop proceeds to return to the timer interrupt function T102 to wait until the next set of samples should be taken.

If the response to the second sample decision SD200 is affirmative, the main instruction loop proceeds to execute the fifth main program function designated F500 which includes the execution of a long delay subroutine.

Upon completion of the fifth main program function F500, the main instruction loop proceeds to execute a sixth main program function designated F600 which includes execution of the display subroutine followed by a zeroing of the sums for the phase and ground currents for the individual samples.

After completing the sixth main program function F600, the main instruction loop proceeds to execute a third sample decision designated SD300 which asks whether 256 samples have been completed. A negative response to the third sample decision SD300 results in a return to the timer interrupt function T102. If the response to the third sample decision SD300 is affirmative, the main instruction loop proceeds to execute the seventh main program function designated F700 which executes the subroutine for calculating average power and for scaling the power and energy for use with the display subroutine.

Following completion of the seventh main program function F700, the main instruction loop proceeds to execute a fourth sample decision designated SD400 which asks whether this sample is a 65,536th sample. If the answer to the fourth sample decision SD400 is negative, the main instruction loop is completed and proceeds to return to the timer interrupt function T102. If the response to the fourth sample decision SD400 is affirmative, the main instruction loop proceeds to execute the eighth main program function designated F800 which executes a subroutine for determining a peak demand value for use with the display subroutine. Upon completion of the eighth main program function F800, the main instruction loop has been completed so that the main instruction loop can proceed back to the timer interrupt function T102 to begin the sampling sequence over.

B. Main Program Function F100 of FIG. 17

Figure 17:
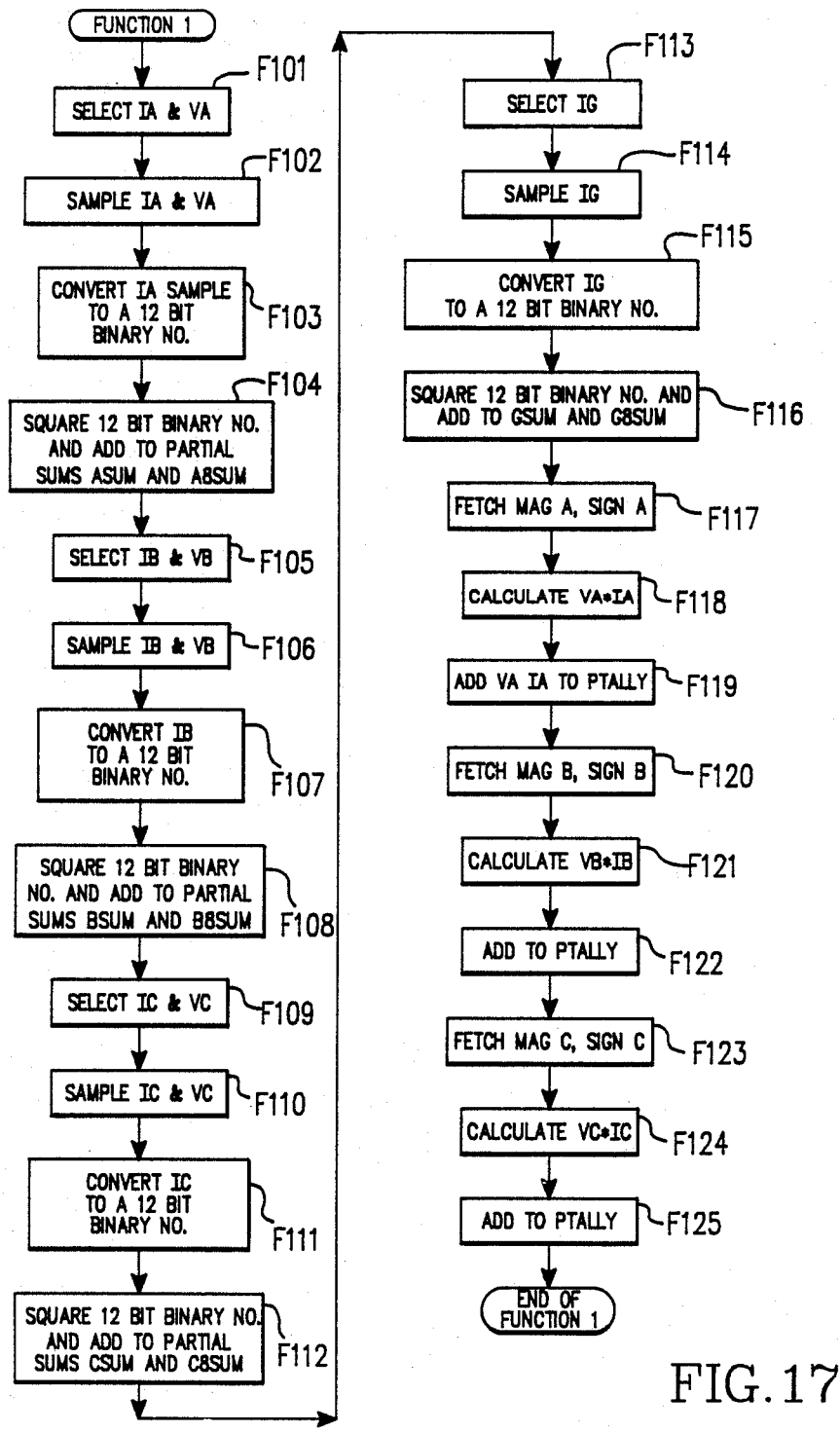
FIG. 17 is a flow chart of the first function of the main instruction loop shown in FIG. 16.

As seen in FIG. 17, the sequence of operations performed in the first main program function F100 begins with selecting the current in phase A designed IA, as well as the line-to-neutral voltage associated with phase A designed VA, for digitization, such selecting function being designated F101. Following selection of the phase current IA and line-to-neutral voltage VA, the subroutine proceeds to sample the phase current IA and line-to-neutral voltage VA via A/D channels 1 and 2 as shown in the block designated F102. A conversion of the magnitude of phase current IA is performed in the next function block designated at F103, such conversion resulting in the phase current IA being represented as a 12-bit binary number. A squaring operation is performed on this 12-bit binary number which represents the phase current IA squared as shown in the function block F104. This squared value for the phase current IA is then added to current summations for phase A which are designated ASUM and A8SUM and which represents a summation of 64 squared currents and 8 squared currents, respectively.

This same sequence of operations is repeated for the currents and line-to-neutral voltages for phases B and C. Accordingly, the function blocks F105 through F108 operate on phase B current and line-to-neutral voltage VB. The function blocks F109 through F112 operate on phase C. Protection features of the solid-state circuit interrupter 60 are performed as well using ground fault currents, function blocks F113 through F116 illustrate the performance of the above-mentioned operations on the current measured as flowing in the ground path associated with the electrical conducting circuit.

Following the above operations, the instantaneous power in each of phases of the electrical conducting circuit is calculated and summed. In order to perform this calculation as for instance on the current of phase A, the program first fetches the value for the magnitude of current in phase A, as well as the sign of the current, such fetching operation being shown in function block F117. Having already sampled the line-to-neutral voltage for phase A, the function block F118 illustrates that the power value can be calculated by multiplying this line-to-neutral voltage for phase A by the current of phase A, while still taking into consideration the sign of the current. Function block F119 illustrates that the result of this calculation is then added to a power tally. Function blocks F120 through F122 illustrate the calculation of the power and addition to power tally in phase B of the system, function blocks F123 through F124 illustrate the similar calculation and addition for the power in phase C. Upon completion of function block F124, the first main program function F100 is completed so that the main instruction loop can then proceed to execute the first sample decision SD100.

C. Second Main Program Function F200 of FIG. 18

Figure 18A:
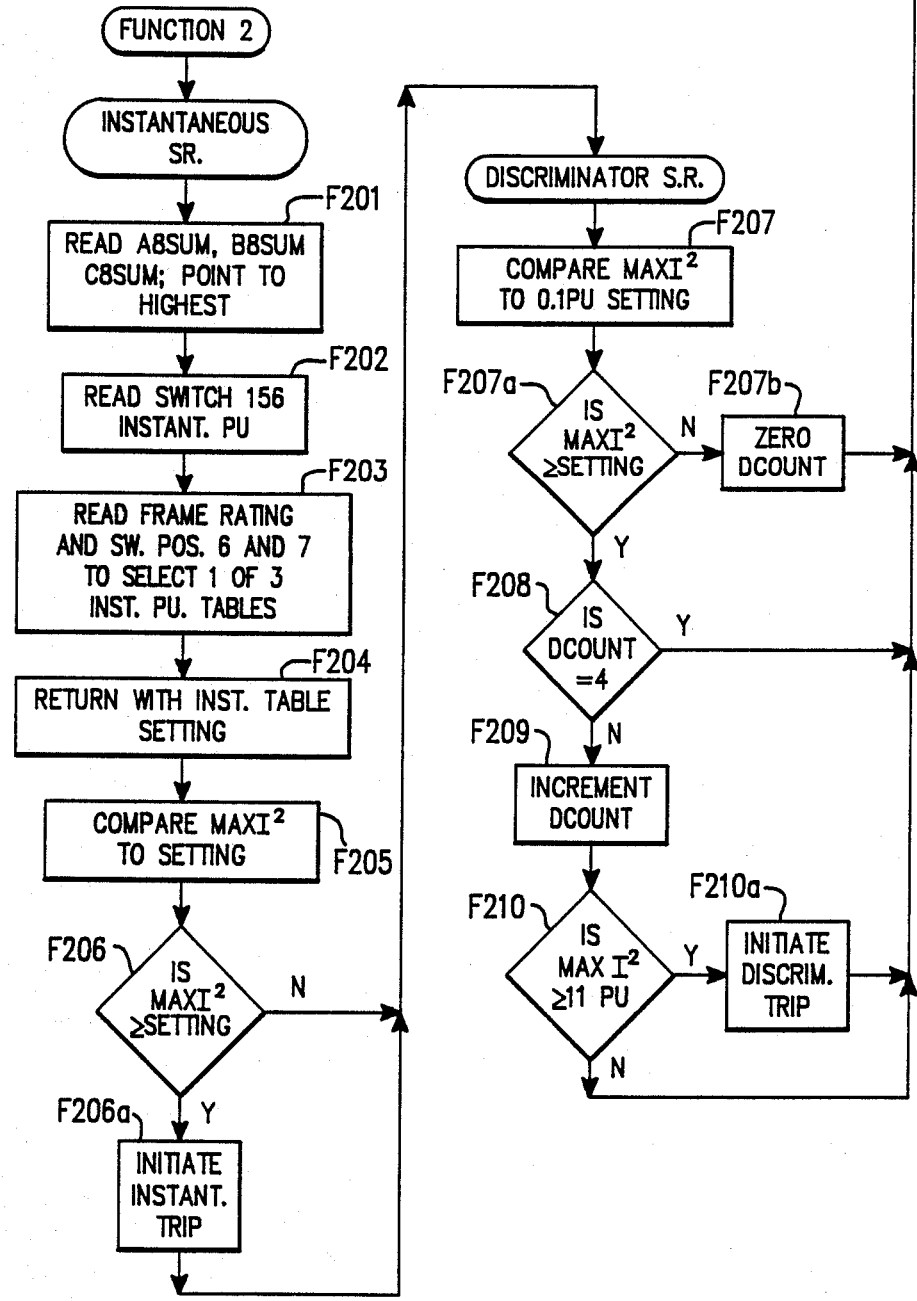
FIGS. 18A and 18B are flow charts of the second function of the main instruction loop shown in FIG. 16.
Figure 18B:
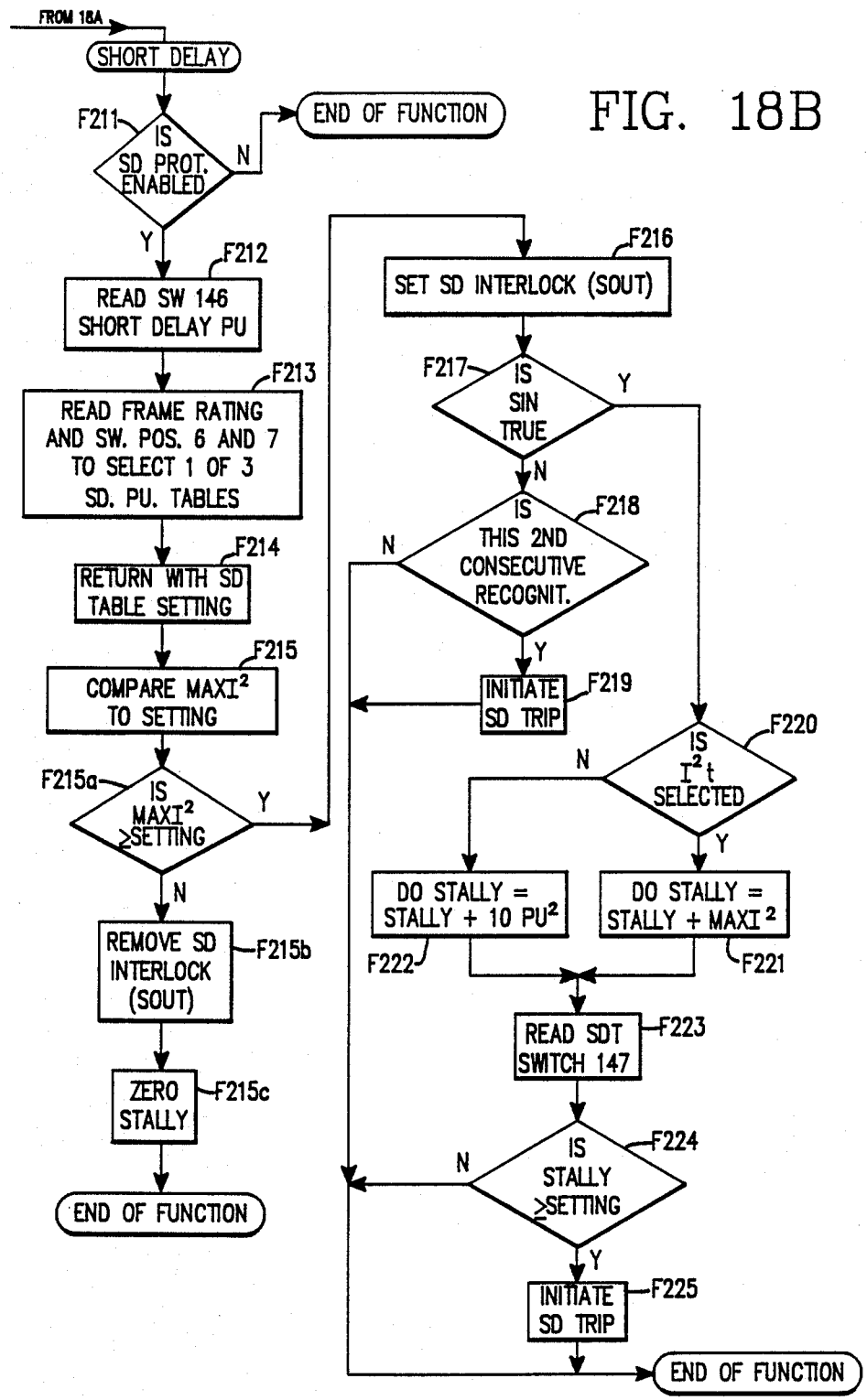

The second main program function F200 shown in FIG. 18 is executed following a determination by the first sample decision SD100 that a group of 8 samples have been completed.

Upon so determining that this is an 8th sample, the second main program function F200, proceeds to execute the instantaneous subroutine which begins by fetching the squared current summations for the previous eight samples designated A8SUM, B8SUM, and C8SUM, and which are illustrated in function block F201. Function block F201 also serves to point to the highest of the squared current summations designated MAXI$^2$. The instantaneous subroutine proceeds to perform a switch-read operation on switch 156 which signifies the instantaneous pickup selection, such switch-read operation being designated F202.

Following a determination as to which of three instantaneous pickup tables are to be used based on the rating plug coding 63d which reflects the frame type and the breaker plug type as illustrated in function block F203, a value of instantaneous pickup is selected, F204. Also illustrated in function block F203 is the allocation of the 6th and 7th switch positions on the INSTPU SW156 as being determinative of the limit values for the instantaneous pickup factor for the particular type of circuit interrupter being used, these two settings establishing the per unit multipliers (M1, M2) utilized in the main instruction loop for purposes of conversion.

The instantaneous subroutine performs a comparison operation between these two values as shown in function block F205 and, if the MAXI$^2$ value exceeds the instantaneous pickup table reading, an instantaneous trip condition is initiated as illustrated in function block F206 and F206a.

The discriminator subroutine serves the purpose of monitoring the current conditions during initial power flow through the circuit interrupter. For this purpose, the discriminator subroutine only operates during the first few cycles, and is bypassed thereafter until a subsequent initial power flow occurs. It should also be noted that initial power flow is detected as the onset of a preselected minimum current value in the electrical conducting circuit.

Function block F207 illustrates the minimum current value that will initiate operation of the discriminator subroutine as 0.1 per unit. A failure to meet this minimum current value results in a zeroing of a discriminator count designated DCOUNT, F207a. If this value has been exceeded, the discriminator subroutine proceeds to execute the discriminator protection and increment the discriminator counter DCOUNT until a value of 4 is reached, F208. If the value of DCOUNT has reached the value of 4, the function block F208 directs the sequence of operation to terminate the discriminator protection. Discriminator protection consists of comparing the MAXI$^2$ value to a preselected current value, in this case 11 per unit, such check function being shown as function block F210. If the MAXI$^2$ value exceeds the preselected value, a discriminator trip is initiated, F211.

The short delay subroutine, since it is related to an optional short delay protection feature, must first verify that the short delay protection feature has been selected by checking the jumper J303 associated with the selection multiplexer 193. If this checking operation F211, results in a determination that the short delay protection feature has not been selected, the second main program function F200 is completed.

If the short delay protection feature has been selected, a switch-read operation F212, is performed on the short delay switch 146 and, depending upon a determination as to the rating plug coding 63d which reflects the frame type and the breaker plug type, F213 for the solid-state circuit interrupter 60, one of three short delay pickup table settings SDPU is identified, as shown in F214. Similar to the allocation of switch positions 6 and 7 on the INSTPU SW156, the 6th and 7th switch positions for the 5DPU switch 146 determine the short delay current limits for the particular type of circuit interrupter. The information conveyed by the 5DPU switch 146 includes 6 fixed settings and the 2 variable settings, which when selected, have values as marked on the rating plug 63c.

This short delay setting SDPU is then compared, F215, with the MAXI$^2$ value. If the value MAXI$^2$ is less than the SDPU setting, the short delay subroutine ensures the absence of the SOUT signal, F215a, then zeros a short delay tally count STALLY, F215b, and then proceeds to the end of the second main program function F200.

When the MAXI$^2$ value is greater than or equal to the SPDU setting, an instruction to issue the SD interlock signal SOUT is executed, F216. Rather than initiating a short delay trip condition at this time, the short delay trip subroutine first determines whether the short delay interlock signal SIN is present, F217, which would indicate that the short delay fault condition has been identified by another solid-state circuit interrupter. Absent receiving this short delay interlock input signal, SIN, the short delay subroutine, then proceeds to inquire whether this is the second consecutive recognition of the short delay condition, F218. The requirement of two consecutive recognitions of this condition therefore prevents the occurrence of a false initiation of the short delay trip condition which may be due to noise conditions.

In contrast to the rapid initiation of the short delay trip condition when the short delay fault has occurred at the present location, in the absence of an active SOUT signal, an active SIN signal results in the execution of a time delayed response to the detected short delay fault condition.

Under the time delayed portion of the short delay subroutine, the response can be either of the I$^2$T type F220 or fixed time, F222. If an I$^2$T response has been selected, which corresponds to the dashed, sloped short delay curved portion 45b shown in FIG. 5, a short delay tally designated STALLY is calculated, F221, for use in comparing with a short delay tally limit designated STALLY LIMIT which is a preselected value taken from a short delay tally table, according to the selection of the SDT factor as read from the SDT switch 147, F223.

The STALLY value for the I$^2$T response is calculated based on the relationship STALLY=STALLY+MAXI$^2$ where the resultant STALLY equals the previous STALLY incremented by the MAXI$^2$ factor. In the event the comparing function F224 determines that the measured STALLY is equal to or exceeds the STALLY limit, a short delay trip condition is initiated F225, and the second main program function is ended.

If the I$^2$T response has not been selected, the measured STALLY factor is determined by the relationship STALLY=STALLY+1OPU$^2$, and this value is then compared to the STALLY limit to determine whether a short delay trip should be initiated. The calculation for the measured STALLY under function block F222 results in a fixed time trip corresponding to the response curve shown in the solid, vertical short delay curved portion 45a of FIG. 5.

D. Third Main Program Function F300 of FIG. 19

Upon completion of the short delay subroutine, the main instruction loop proceeds to execute the third main program function F300 which performs the operations of selecting a proper ground fault setting GFPU and using this ground fault setting for comparing with the measured ground fault value to determine if and when a ground fault trip condition should be initiated.

As seen in FIG. 19, the ground fault subroutine first verifies via a check of jumper J304 from the selection multiplexer 193 whether the ground fault protection feature is, in fact, utilized in this application. If the ground fault protection feature has not been selected, the main instruction loop proceeds to the next main program function. When this feature has been selected, the ground fault subroutine will inquire whether the operator has requested a test operation, F301 and if so, whether the measured ground fault current at this time is equal to or greater than a predetermined threshold value, F302. If such a ground current is detected, the subroutine disregards the request for a test operation, F302a. However, if this ground fault current is below the threshold level, a switch-red operation F321 is performed on the test rotary switch 150 to select a test value with this value being substituted into the comparison operation to determine whether a ground fault trip condition should be initiated F322.

If the test operation has not been called by the operator, the ground fault subroutine performs a switch-read operation, F303, on the GFPU switch 148 and this value is utilized to fetch a ground fault pickup value GFPU for use in the subsequent operation.

Following the determination of this GFPU value, the ground fault subroutine selects the plug rating value from channel 3 of the A/D converter 82 and then executes the portion of the program which verifies that the selected GFPU value is within the UL/NEC specification standards.

The comparison operation, F309, is performed between the measured ground fault current value taken from the summation of the ground currents for the previous eight samples which is designated G8SUM, and the selected GFPU value. A ground interlock output signal GOUT is issued if the G8SUM value equals or exceeds the GFPU setting, F310. If the GFPU factor has been exceeded, a check is first made to see whether a ground fault interlock signal GIN has been received from another solid-state circuit interrupter F311. If such GIN signal has been received, the ground fault subroutine performs a time delayed response similar to that performed in a short delay protection, F314. If the GIN signal has not been detected, the ground fault subroutine executes the same type of rapid trip response as is executed in the short delay subroutine. That is, a second consecutive occurrence of ground overcurrent must be detected, F312, in order to initiate a ground fault trip condition, F313, thus preventing a false trip in the event that the first occurrence was a result of noise.

Also similar to the short delay subroutine, when a GIN signal has been received, the ground fault subroutine executes a time delay response that can be either an I$^2$T response or a fixed time response, F314. If an I$^2$T response has been selected which corresponds to the dashed, sloped ground fault curved portion 48b of FIG. 5, a ground tally value GTALLY is calculated, F315, using the relationship GTALLY=GTALLY+G8SUM. If the I$^2$T response has not been selected, GTALLY is calculated as $GTALLY = GTALLY + 0.625 \text{ PU}^2$, F316. A GTALLY limit is selected as a function of the GFT switch, 149. The comparing operation of the calculated GTALLY with the GTALLY LIMIT, F317, provides the determination as to whether or not to initiate the ground fault trip condition F313. It should be noted that the GTALLY measure does not go to zero following a determination that G8SUM has fallen below GFPU. Instead, the GTALLY figure, upon occurrence of a G8SUM value less than the GFPU value, is decremented by a specific factor defined by the relationship $GTALLY = GTALLY - 0.25 \text{ PU}^2$. This enables the ground fault subroutine a means to handle arcing ground faults.

Figure 20:
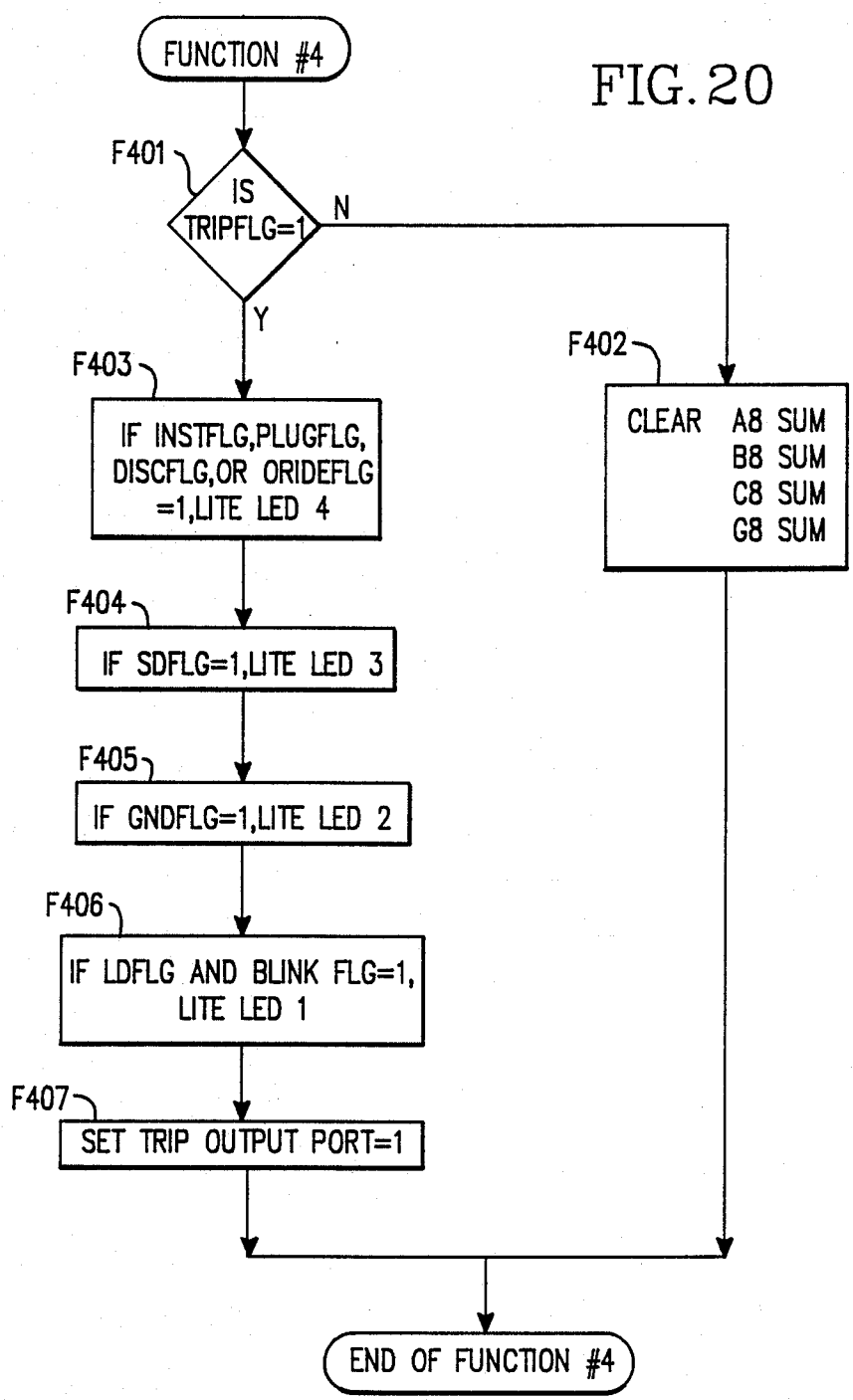
FIG. 20 is a flow chart for the fourth function of the main instruction loop shown in FIG. 16.

E. Fourth Main Program Function F400 of FIG. 20

Having executed the subroutine which put into effect the various protection features such as the instantaneous protection, discriminator protection etc. the operation of converting this initiated trip condition into an operation that actuates the trip mechanism and displays the necessary cause of fault information remains to be performed. This conversion operation is performed by the fourth main program function F400 shown in FIG. 20 which includes primarily the trip subroutine.

The trip subroutine first determines whether the trip flag has been set, F401, the trip flag being the particular bit within the programmed bit assignments that is activated by any one of the protection subroutines which can initiate a trip condition. If it is determined that the trip flag has not been set, the trip subroutine will proceed to clear the contents stored for the accumulated squared phase currents and ground current taken for the previous eight samples, these accumulated currents being designated the A8SUM, B8SUM, C8SUM and G8SUM, and following this, to proceed to the end of the fourth main program function F400. If it is determined that the trip flag has been set, the trip subroutine then determines which protection subroutine has initiated the trip condition and lights the appropriate cause of fault LED thereby.

If the trip flag has been set by the instantaneous subroutine, the plug checking subroutine, the discriminator subroutine, or the override subroutine an LED designated LED4 is lit. If a short delay trip condition has been detected, an LED designated LED3 is lit. If a ground fault trip condition has been detected, an LED designated LED2 is lit. If a long delay trip condition has been detected, an LED designated LED1 is lit in either a continuous or blinking manner conditioned upon whether a long delay trip condition has occurred, or whether a condition approaching a long delay trip condition is existent. Following the determination as to which protection feature initiated the trip condition, the trip subroutine then proceeds to set the trip output port to 1 which thereby enables actuation of the trip mechanism 93. With the trip output port now set high, the trip subroutine is complete.

Figure 21:
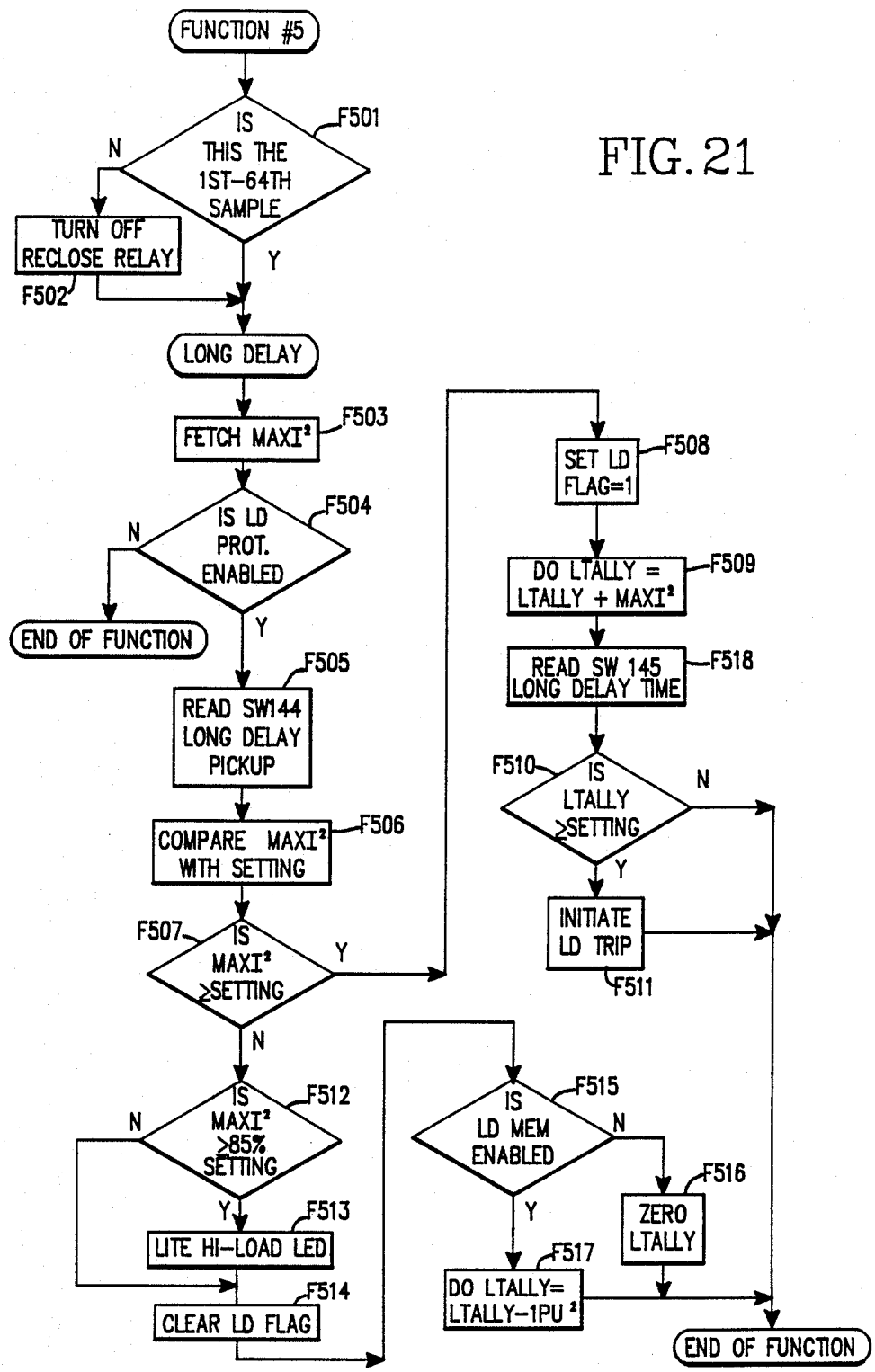
FIG. 21 is a flow chart of the fifth function of the main instruction loop shown in FIG. 16.

F. Fifth Main Program Function F500 of FIG. 21

The fifth main program function F500 which consists essentially of the long delay subroutine, is executed only upon detection that the main instruction loop has completed a group of 64 samples, this determination being made by the second sample decision SD 200 shown in FIG. 16.

Following the completion of the first 64th sample group, the fifth main program function initiates an instruction for turning off the reclose relay driver, thereby limiting the duration of reclose relay activation to approximately ¼ second.

The first operation, F503 performed by the long delay subroutine is the fetching of the MAXI$^2$ value previously determined during the execution of the first main program function F100. After determining that the long delay protection feature has been selected, the long delay subroutine then fetches on LDPU value according to the setting of the LDPU switch, 144 and the selection of a first or a second long delay table determined by checking whether a long delay table jumper J301 or J302 associated with the selection multiplexer 193 has been selected.

A comparison between the MAXI$^2$ value previously fetched and the LDPU factor just fetched then determines whether an LDPU flag should be set or whether an alternate long delay subroutine path should be taken that determines whether the LDPU factor is being approached which would merit lighting the High Load LED.

If the LDPU factor has been equalled or exceeded by the MAXI$^2$ value, the LDPU flag is set and a long delay tally designated LTALLY is calculated as $LTALLY = LTALLY + MAXI^2$. The resultant LTALLY value is then used in a comparison with the LTALLY LIMIT which is determined as a function of a reading of the LDT switch 145. If the resultant measured LTALLY exceeds the LTALLY LIMIT, a long delay trip condition is initiated and the fifth main program function F500 is then ended. If the resulant LTALLY is less than the LTALLY LIMIT, the fifth main program function F500 is ended without initiating a long delay trip condition.

If the LDPU flag has not been set as occurs when the MAXI$^2$ value is less than the LDPU factor, the long delay subroutine follows the alternate program path that determines whether the MAXI$^2$ value is equal to or in excess of 85% of the LDPU factor. If so, the high load LED is lit; if not, the LDPU flag is cleared. This alternate program path of the long delay subroutine then determines whether a long delay memory feature has been selected via the selection jumper J307 associated with the selection multiplexer 193. If the long delay memory has not been selected, the factor LTALLY is cleared following the clearing if the LDPU flag. If the long delay memory feature is selected, similar to the situation of the ground fault tally, GTALLY, the long delay tally, LTALLY, is decremented so that is the event of a sporadic occurrence of the MAXI$^2$ value exceeding or being equal to the LDPU factor, the LTALLY factor some will retain some non-zero value. The decrementing of LTALLY is done using the relationship $LTALLY = LTALLY - 1 \text{ PU}^2$ with a lower limit of zero. Following this decrementing operation the fifth main program function F500 is complete and the main instruction loop can then proceed to execute the sixth main program function F600.

Figure 22:
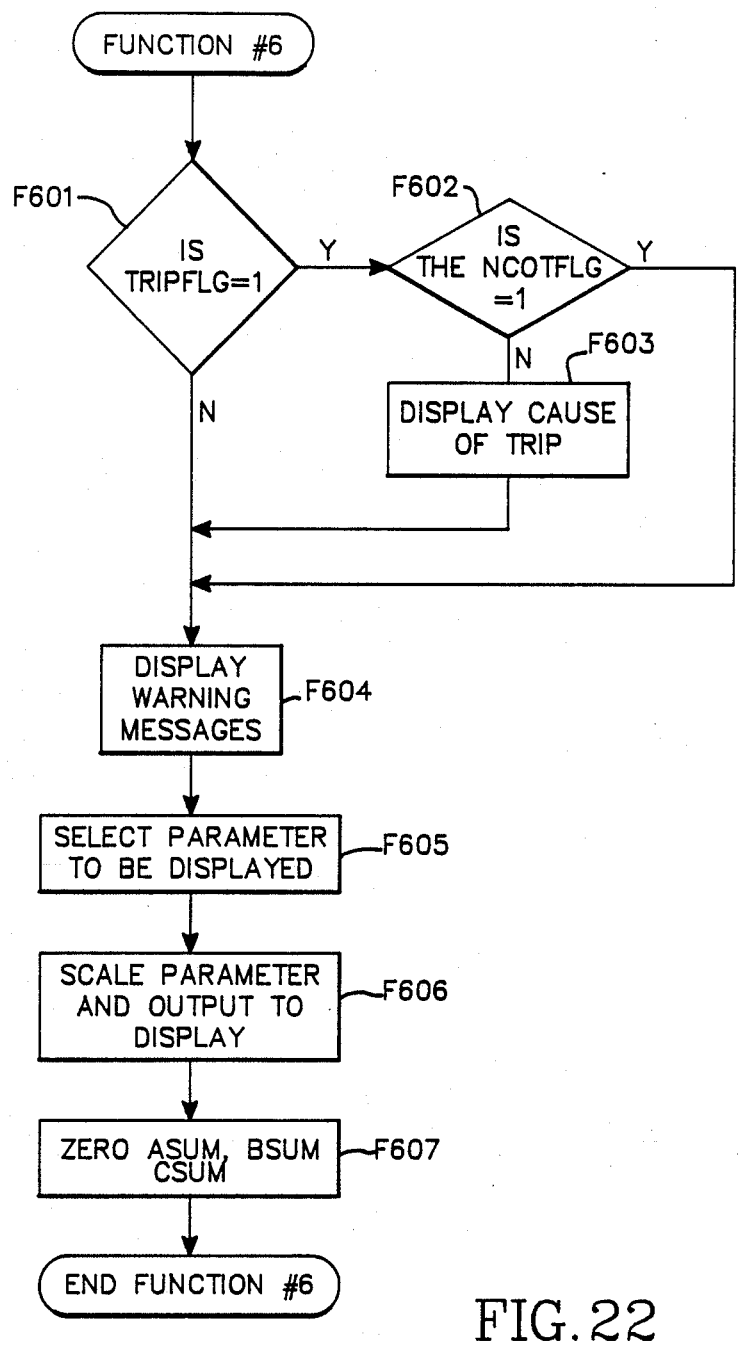
FIG. 22 is a flow chart of the sixth function of the main instruction loop shown in FIG. 16.

G. Sixth Main Program Function F600 of FIG. 22

Also executed after the 64th sample is the sixth main program function F600 which includes primarily the display subroutine shown in FIG. 2.

The first function executed in the display subroutine is the determination of whether a trip flag is set, F601. If it has been determined that a trip condition has been initiated, the display subroutine then determines if a no-cause-of-trip flag is set, F602. If the no-cause-of-trip flag is set, the display subroutine proceeds to display any existing warning message, F604, if necessary. If the no-cause-of-trip flag is not set, the display subroutine displays any existing cause of trip messages F603. The types of warning messages displayed in order of priority by function F604 correspond to RAM failure, ROM failure, plug failure, negative power condition, and long delay pickup condition.

If no warning or trip messages are warranted, the display subroutine selects the parameter to be displayed, which can be one of the following: RMS phase currents, peak demand value, present demand value, or energy. This selection is ultimately under user control via manipulation of the display step pushbutton 132.

Once selected, the parameter to be displayed is first scaled and output, F606, to the alpha-numeric display element 120. Once this information is output to the display, the display subroutine performs housekeeping chores such as clearing the individual phase current summations designated ASUM, BSUM and CSUM. At this time, the display subroutine is completed, as is the sixth main program function F600 so that the main instruction loop can then proceed to execute a third sample decision SD300 which, as shown in FIG. 16.

H. Seventh Main Program Function F700 of FIG. 23

Having determined that the main instruction loop has completed a 256th sample or a multiple of 256, the seventh main program function F700 which includes primarily a scaling subroutine for scaling the power and energy, is executed.

Figure 23:
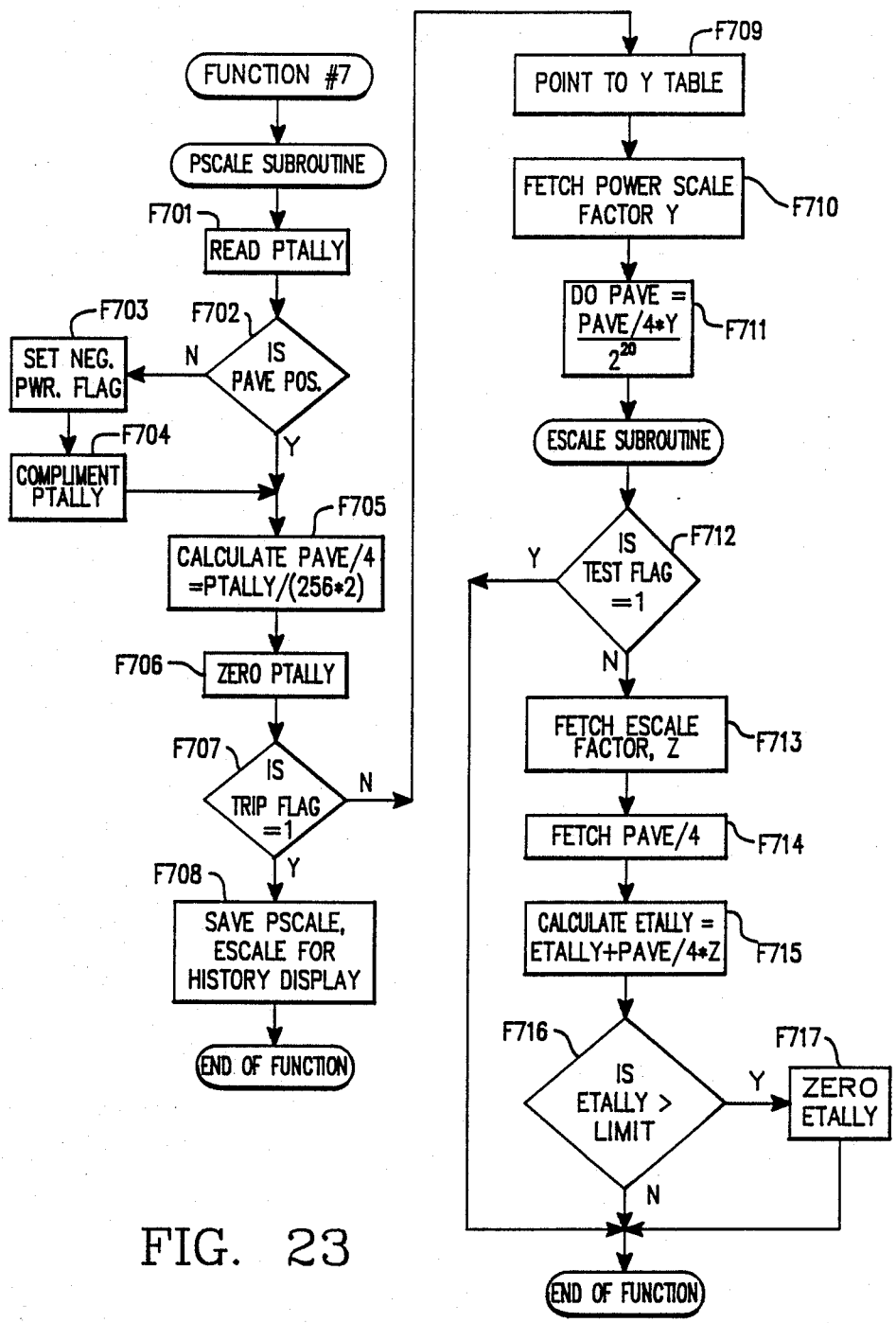
FIG. 23 is a flow chart of the seventh function of the main instruction loop shown in FIG. 16.

As seen in FIG. 23, a power scaling subroutine first fetches, F701, a PTALLY value which is a summation of the instantaneous phase power values.

The power scaling subroutine then verifies via instruction F702, that a positive PTALLY value is present, the alternative being that otherwise a negative power flow is occurring which would then result in the setting of the negative power flag so that this information can be displayed. If a negative power situation is detected, the power scaling subroutine then performs a two's complement operation upon PTALLY to produce a positive equivalent value, F704. Power scaling calculates the average power as P-AVE/4=PTALLY (256×2) and then zeros the value PTALLY, F705.

Before scaling the calculated average power values, the power scaling subroutine first determines whether a trip flag has been set and that if it has, to save the previously calculated values of power and energy so that a history display will include these parameters and prevent alteration for the duration of the trip event.

If no trip has occurred, the power scaling subroutine then fetches a power scale factor designated Y from a power scale table and scales the P-AVE/4 value according to the relationship P-AVE=P-AVE/4×Y/$2^{20}$ which calculation yields average power value displayed as MW-H.

Having thus completed the power scaling subroutine, the seventh main program function F700 proceeds to execute the energy scaling subroutine. Similar to the first instruction for the power scaling subroutine, the energy scaling subroutine first determines whether a test flag has been set so that if it has been set, the existing scaled energy value will not be effected by the test value, the presence of a test flag therefore resulting in the completion of the energy scale subroutine and the seventh main program function F700. However, if a test is not active, the energy scaling subroutine proceeds to fetch the energy scale factor designated Z from a table of energy scaling factors. Having this energy scale factor Z, the energy scaling subroutine then fetches the P-AVE/4 factor and proceeds to calculate the energy tally value designed ETALLY by use of the equation ETALLY=ETALLY+P-AVE/4×Z. Before presenting this scaled energy tally value for display, the energy scaling subroutine must first determine whether this calculated ETALLY value exceeds a predetermined limit which is established as a function of the display capabilities of the alpha numeric display 120. In this instance, this ETALLY limit is established as 99.9 MW-H which measure represents megawatt hours. If the ETALLY has exceeded the ETALLY limit, the energy scaling subroutine zeros the ETALLY and proceeds to create a fresh ETALLY value which is then made available for display. With the completion of the energy scaling subroutine, the seventh main program function F700 is completed so that the main instruction loop can proceed to execute a fourth sample decision where it is determined whether or not the main instruction loop is in a 65,536th sample.

Figure 24:
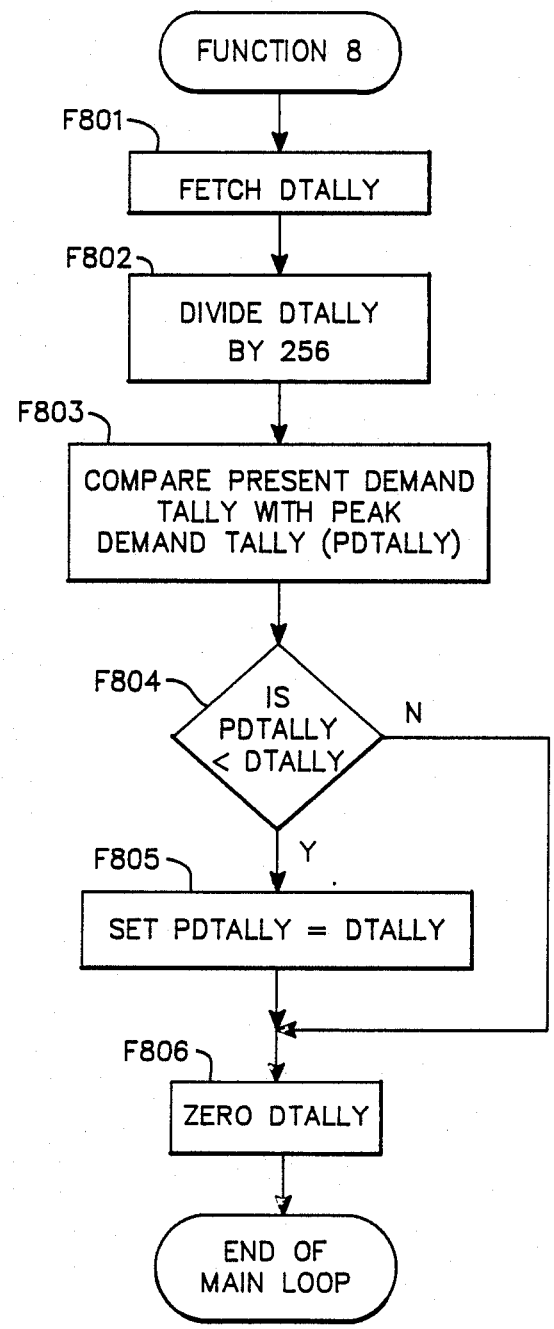
FIG. 24 is a flow chart of the eighth function of the main instruction loop shown in FIG. 16.

I. Eighth Main Program Function F800 of FIG. 24

If the main instruction loop has determined that this is a 65,536th sample interval the main instruction loop executes the eighth main program function which primarily performs the task of scaling the peak demand value for display. This peak demand subroutine first executes a fetch operation for a present demand tally designated DTALLY which was calculated as the sum of 256 PAVE valued which are available at the 256th sample intervals. The peak demand subroutine then divides the DTALLY figure by 256 to determined the average present demand value that has occurred over the previous 65,536 samples. It should be noted at this time that the completion of the 65,536th sample correlates approximately to the completion of a five-minute interval since the calculation of the last peak demand value. The peak demand subroutine then executes an operation whereby the latest measured demand value designated DTALLY is compared with the peak demand tally designated PDTALLY which is held in storage and represents the highest demand value recorded since power up. If it is determined that the existing peak demand tally is less than the latest calculated demand tally, the latest present demand tally is then retained and becomes the new peak demand value. If the present demand tally does not exceed the existing peak demand tally, the existing peak demand tally is retained. The peak demand subroutine then zeros the present demand tally DTALLY and completes the execution of the eighth main program function as well as the completion of the main instruction loop so that the sequence of sampling events can be restarted.

Although the hereinabove described embodiment constitutes a preferred embodiment of the invention, it should be understood that modifications may be made thereto without departing from the scope of the invention as detailed in the appended claims.

We claim:

1. A circuit interrupter apparatus operable at a selected one rating from a range of current withstanding ratings, comprising:
   interrupting means disposed in a normally conducting electrical circuit and effective to interrupt current flow through said electrical circuit upon the reception of a trip signal;

conditioning means coupled to said electrical circuit to condition a current value proportionate to such current flow, said conditioning means producing a conditioned signal representative of the magnitude of said current value;

operating means effective for deriving at least one operating characteristic from said conditioned signal, said operating means further effective for comparing said at least one operating characteristic to a corresponding at least one tripping parameter and generating said trip signal when said at least one operating characteristic is at least equal to said corresponding at least one tripping parameter;

signal developing means receptive of said current value and effective to develop therefrom, an override signal;

said override signal being communicated to a first switching element over a regulating element when said override signal is below a predetermined override value, and said regulating element preventing communication of said override signal to said first switching element when said override signal exceeds said predetermined override value which thereby enables communication of an alternate trip signal to said interrupting means; and whereby said regulating element is disposed within said circuit interrupter apparatus at a position which is removably separable from said signal developing means on one terminal by a first connector and from said first switching element on its other terminal by a second connector such that said regulating element can be replaced in the event of a change in such selected one rating from such range of current withstanding ratings without effect to said developing means and said first switching element.

2. A circuit interrupter apparatus as set forth in claim 1, wherein said electrical circuit is a three-phase circuit having associated therewith a respective three distinct override signals developed from three distinct current values, and further wherein said signal developing means includes a voltage developing circuit effective such that said three distinct current values are converted into a corresponding three distinct voltage signals, said signal developing means further including an auctioneering circuit effective such that a highest one of said corresponding three distinct voltage signals is designated as said override signal.

3. A circuit interrupter apparatus as set forth in claim 1 wherein said signal developing means includes a voltage developing circuit effective such that at least one current value is converted into a corresponding voltage signal.

4. A circuit interrupter apparatus a set forth in claim 3 wherein said regulating element is a voltage regulating element receptive of said voltage signal so that a breakdown condition of said voltage regulating element occurs when said override signal exceeds said predetermined override value and thereby biases said first switching element to such off condition.

5. A circuit interrupter apparatus as set forth in claim 4 wherein said voltage regulating element is a Zener diode having a predetermined breakdown value associated therewith, said predetermined breakdown value corresponding to said breakdown condition.

6. A circuit interrupter apparatus as set forth in claim 4 wherein said first switching element is a transistor and said override signal is coupled to a terminal of said transistor following said breakdown condition of said voltage regulating element, said override signal serving to negative-bias said terminal so that current is prevented from flowing across a junction of said transistor said first switching element being disposed in a first current path.

7. A circuit interrupter apparatus as set forth in claim 6 wherein a second current path branches off from said first current path at a point upstream of said junction of said transistor.

8. A circuit interrupter apparatus as set forth in claim 7 further comprising an override sense signal generated when said first switching element is in such off condition, said override sense signal being communicated from a portion of said first current path which is common with said second current path to said operating means to indicate occurrence of an override condition causing actuation of said interrupting means.

9. A circuit interrupter apparatus as set forth in claim 7 further comprising a diode element disposed in said second current path which branches off from a second terminal of said transistor, a portion of such current that is prevented from flowing across said junction of said transistor being diverted through said second current path over said diode element, to a second electronic switching element.

10. A circuit interrupter apparatus as set forth in claim 9 wherein said second electronic switching element is a second transistor and said diverted portion of such current is said alternate trip signal which is effective such that said second transistor is actuated thereby.

* * * * *